United States Patent
How et al.

(10) Patent No.: US 7,944,236 B2
(45) Date of Patent: May 17, 2011

(54) HIGH-BANDWIDTH INTERCONNECT NETWORK FOR AN INTEGRATED CIRCUIT

(75) Inventors: Dana How, Palo Alto, CA (US); Godfrey P. D'Souza, San Jose, CA (US); Malcolm J. Wing, Palo Alto, CA (US); Colin N. Murphy, Belmont, CA (US); Arun Jangity, Sunnyvale, CA (US)

(73) Assignee: Agate Logic, Inc., Cupertino, CA (US)

( * ) Notice: Subject to any disclaimer, the term of this patent is extended or adjusted under 35 U.S.C. 154(b) by 0 days.

(21) Appl. No.: 12/855,466

(22) Filed: Aug. 12, 2010

(65) Prior Publication Data
US 2010/0306429 A1 Dec. 2, 2010

Related U.S. Application Data

(62) Division of application No. 11/901,182, filed on Sep. 14, 2007, now Pat. No. 7,902,862.

(51) Int. Cl.
*H03K 19/173* (2006.01)

(52) U.S. Cl. ............... 326/38; 326/41; 326/47

(58) Field of Classification Search ............ 326/37–41, 326/47; 370/352, 359; 341/100, 101
See application file for complete search history.

(56) References Cited

U.S. PATENT DOCUMENTS

| | | | |
|---|---|---|---|
| 6,034,542 A | 3/2000 | Ridgeway | |
| 6,448,808 B2 | 9/2002 | Young et al. | |
| 6,459,393 B1 * | 10/2002 | Nordman | 341/100 |
| 7,064,690 B2 * | 6/2006 | Fowler et al. | 341/101 |
| 7,268,581 B1 * | 9/2007 | Trimberger et al. | 326/38 |
| 7,417,455 B2 | 8/2008 | Verma et al. | |
| 7,444,456 B2 | 10/2008 | Plants | |
| 7,557,605 B2 * | 7/2009 | D'Souza et al. | 326/38 |
| 2005/0193357 A1 | 9/2005 | Honary et al. | |

* cited by examiner

*Primary Examiner* — Rexford N Barnie
*Assistant Examiner* — Crystal L Hammond
(74) *Attorney, Agent, or Firm* — Radlo & Su LLP

(57) ABSTRACT

A bus structure providing pipelined busing of data between logic circuits and special-purpose circuits of an integrated circuit, the bus structure including a network of pipelined conductors, and connectors selectively joining the pipelined conductors between the special-purpose circuits, other pipelined connectors, and the logic circuits.

94 Claims, 21 Drawing Sheets

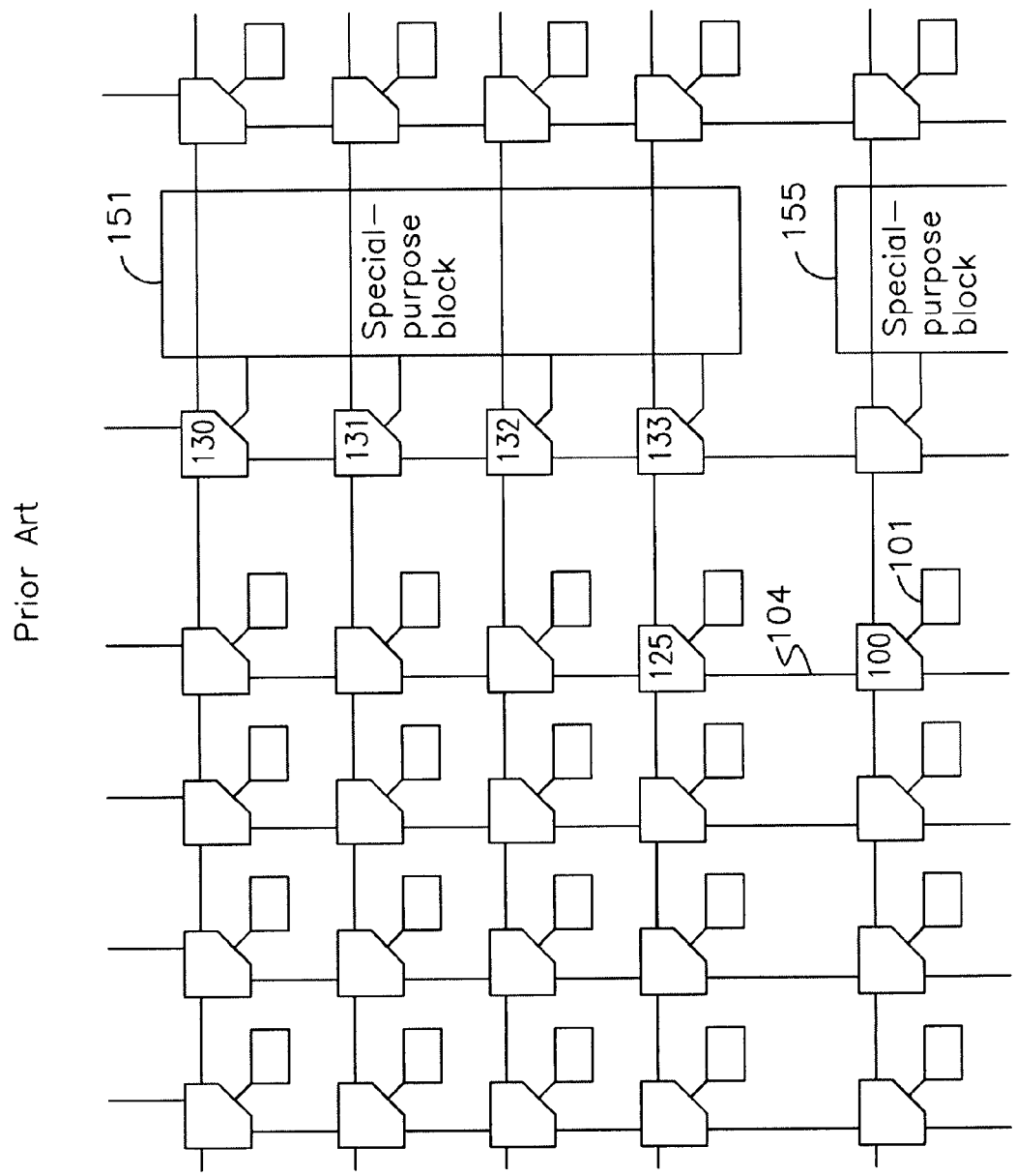

HIGH-BANDWIDTH INTERCONNECT NETWORK FOR AN INTEGRATED CIRCUIT

CROSS REFERENCE TO RELATED APPLICATIONS

This application is a division of U.S. patent application Ser. No. 11/901,182, filed on 14 Sep. 2007, now issued as U.S. Pat. No. 7,902,862, entitled High-Bandwidth Interconnect Network for an Integrated Circuit, the disclosure of which is incorporated by reference herein in its entirety.

BACKGROUND OF THE INVENTION

1. Field of the Invention

This invention relates to a network for efficient communication within a digital system and, in particular, to a multi-stationed grid of stations and interconnecting buses providing a high-speed pipelined and configurable communication network for a field-programmable gate array.

2. History of the Prior Art

Digital systems can be implemented using off-the-shelf integrated circuits. However, system designers can often reduce cost, increase performance, or add capabilities by employing in the system some integrated circuits whose logic functions can be customized. Two common kinds of customizable integrated circuits in digital systems are application-specific integrated circuits (ASICs) and field-programmable gate arrays (FPGAs).

ASICs are designed and manufactured for a particular application. An ASIC includes circuits selected from a library of small logic cells. A typical ASIC also includes large special-purpose blocks that implement widely-used functions, such as a multi-kilobit random-access memory (RAM) or a microprocessor. The logic cells and special-function blocks are placed at suitable locations on the ASIC and connected by means of wiring.

Application-specific integrated circuits (ASICs) have several advantages. Because an ASIC contains only the circuits required for the application, it has a small die size. An ASIC also has low power consumption and high performance.

ASICs have some disadvantages. It takes a lot of time and money to design ASICs because the design process is complex. Creating prototypes for an ASIC is complex as well, so prototyping also takes a lot of time and money.

Field-programmable gate arrays (FPGAs) are another kind of customizable integrated circuit that is common in digital systems. An FPGA is a general-purpose device. It is meant to be configured for a particular application by the system designer.

FIG. 21 provides a schematic diagram of a portion of a conventional FPGA. The FPGA includes a plurality of general-purpose configurable logic blocks, a plurality of configurable special-purpose blocks, and a plurality of routing crossbars. In an example, each logic block, such as logic block 101, may include a plurality of four-input lookup tables (LUTs) and a plurality of configurable one-bit sequential cells, each of which can be configured as a flip-flop or a latch. A configurable special-purpose block, such as special-purpose blocks 151 and 155, implements a widely-used function. An FPGA may have more than one type of special-purpose block.

The routing crossbars form a two-dimensional routing network that provides configurable connections among the logic blocks and the special-purpose blocks. In the illustrative FPGA, each routing crossbar is connected to the nearest-neighbor routing crossbars in four directions and to either a logic block or a special-purpose block. For example, routing crossbars 125 and 100 are connected by buses 104. In the example FPGA, each logic block, such as logic block 101, is connected to one routing crossbar, such as routing crossbar 100. Special-purpose blocks are typically much larger than logic blocks and typically have more input and output signals, so a special-purpose block, such as special-purpose block 151, may be connected by a plurality of buses to a plurality of routing crossbars, such as routing crossbars 130-133.

The logic blocks, special-purpose blocks, and routing crossbars contain circuitry (called configuration memory) which allows their operation to be configured. A user's design is implemented in the FPGA by setting the configuration memory appropriately. Several forms of configuration memory are used by contemporary FPGAs, the most common form being static random-access memory. Configuring an FPGA places it in a condition to perform a specific one of many possible applications.

Field-programmable gate arrays (FPGAs) have advantages over application-specific integrated circuits (ASICs). Prototyping an FPGA is a relatively fast and inexpensive process. Also, it takes less time and money to implement a design in an FPGA than to design an ASIC because the FPGA design process has fewer steps.

FPGAs have some disadvantages, the most important being die area. Logic blocks use more area than the equivalent ASIC logic cells, and the switches and configuration memory in routing crossbars use far more area than the equivalent wiring of an ASIC. FPGAs also have higher power consumption and lower performance than ASICs.

The user of an FPGA may improve its performance by means of a technique known as pipelining. The operating frequency of a digital design is limited, in part, by the number of levels of look-up tables that data must pass through between one set of sequential cells and the next. The user can partition a set of look-up tables into a pipeline of stages by using additional sets of sequential cells. This technique may reduce the number of levels of look-up tables between sets of sequential cells and, therefore, may allow a higher operating frequency. However, pipelining does not improve the performance of FPGAs relative to that of ASICs, because the designer of an ASIC can also use the pipelining technique.

It would be desirable to provide circuitry which allows the configurability, low time and cost of design, and low time and cost of prototyping typical of an FPGA while maintaining the high performance, low die area, and low power expenditure of an ASIC. Specialized special-purpose blocks might help the integrated circuit resemble an ASIC by having relatively high performance and relatively low die area. The integrated circuit might retain most of the benefits of an FPGA in being relatively configurable and in needing low time and cost for design and low time and cost for prototyping.

However, a conventional FPGA routing crossbar network cannot accommodate the high data bandwidth of the special-purpose blocks in such an integrated circuit. The operating frequency of signals routed through a routing crossbar network is relatively low. A user may employ pipeline registers to increase the frequency somewhat, but doing so consumes register resources in the logic blocks. Building an FPGA with a much greater number of routing crossbars than usual would increase the data bandwidth, but it is impractical because routing crossbars use a large area.

SUMMARY OF THE INVENTION

It is an object of the present invention to provide area-efficient routing circuitry capable of transferring data at high bandwidth to realize the high performance potential of a hybrid FPGA having special-purpose blocks thereby combining the benefits of FPGAs and ASICs.

The present invention is realized by a bus structure providing pipelined busing of data between logic circuits and special-purpose circuits of an integrated circuit, the bus structure including a network of pipelined conductors, and connectors selectively joining the pipelined conductors between the special-purpose circuits, other connectors, and the logic circuits.

Broadly stated, a programmable integrated circuit having a bus structure for a cross-connection network for data (DCC network) comprises a plurality of stations having an input station, one or more intermediate stations, and a destination station, each station comprising a pipeline register, the input station serializing data at a first frequency X, the one or more intermediate stations registering the serialized data at a second frequency Y, the destination station deserializing the data at a third frequency Z, the first frequency and the second frequency forming a first frequency ratio Y/X, the second frequency and the third frequency forming a second frequency ratio Y/Z, the input station including a first multiplexer coupled between a first serializer and a first pipeline register, a first multiplexer having a plurality of inputs, an output, at least one select signal, the at least one select signal for selecting between the first serializer, other serializers, and other pipeline registers to a first pipeline register; and connectors selectively joining each pipeline register at the corresponding station based on a select signal for selecting between special-purpose circuits, other pipeline registers, and logic circuits.

In another embodiment, a programmable integrated circuit comprises a first station having a first serializer and a first pipeline register, the first serializer coupled to the first pipeline register, the first serializer having an input port for receiving input data at a first frequency and serializing the input data at a second frequency to generate serialized data at an output port; a second station having a second pipeline register and a deserializer, the first pipeline register coupled to the second pipeline register, the second pipeline register coupled to the deserialzer, the deserialzer receiving the serialized data through the second pipeline register at the second frequency and deserializing the serialized data at a third frequency to generate an output data at an output port of the deserializer, the output port of the deserialzer being coupled to a second special-purpose circuit or a second logic circuit; and a first multiplexer and a second multiplexer, the first multiplexer having a first input, a second input, an output, and at least one select signal, the second multiplexer having a first input, a second input, an output, and at least one select signal, the first input of the first multiplexer and the first input of the second multiplexer being commonly coupled to the output port of the deserialzer, the second input of the first multiplexer coupled to an output of the second logic circuit, the second input of the second multiplexer coupled to an output of the second special-purpose circuit, the output of the first multiplexer coupled to an input of the second special-purpose circuit, the output of the second multiplexer coupled to an input of the second logic circuit, the at least one signal of the first multiplexer for selecting between the first and the second input of the first multiplexer, the at least one signal of the second multiplexer for selecting between the first input and the second input of the second multiplexer.

In a further embodiment, a method for data communication having a first station coupled a second station, the first station having a first serializer coupled to a first pipeline register, the second station having a second pipeline register coupled to a deserialzer, comprises serializing input data at a first frequency, by the first serializer, to serialized data at a second frequency; first registering the serialized data received from the serializer at the first pipeline register; selectively coupling the first pipeline register and other pipeline registers to the second pipeline register; second registering the serialized data received from the first pipeline register at the second pipeline register; and deserializing the serialized data at the second frequency from the second pipeline register to output data at a third frequency.

These and other objects and features of the invention will be better understood by reference to the detailed description which follows taken together with the drawings in which like elements are referred to by like designations throughout the several views.

BRIEF DESCRIPTION OF THE DRAWINGS

FIG. 21 shows a schematic diagram of a portion of a conventional field-programmable gate array (FPGA).

DETAILED DESCRIPTION

This description applies to an embodiment of the present invention in a field-programmable gate array (FPGA). However, most aspects of the invention can also be embodied in other kinds of integrated circuit, such as an integrated circuit that consists of numerous digital signal processors.

The preferred embodiment uses static RAM cells for the FPGA configuration memory. However, most aspects of the invention can also be embodied in an FPGA with other kinds of configuration memory, such as fuses, antifuses, or flash memory.

The present invention is a cross-connection network for data (DCC network). A DCC network consists of a grid of stations that spans the entire field-programmable gate array (FPGA). A DCC network has several key advantages over traditional FPGA routing networks. The combination of features enables many applications in the context of a field-programmable integrated circuit.

One advantage of the inventive network is that user data is serialized and then pipelined across the chip. In the preferred embodiment the pipeline frequency can be as high as two GHz, which is difficult to achieve in an ASIC and impossible to achieve in an FPGA. The high frequency provides a performance advantage.

Another advantage is that the pipeline registers are built into the stations. They do not consume register resources in the logic blocks, which provides an area advantage over FPGAs.

A third advantage is that the routing multiplexers in the network switches of the inventive network are configured on a granularity coarser than a single bit. This greatly reduces the number of configuration memory bits and multiplexer ports compared to an FPGA routing network, so it saves a great deal of die area.

These three advantages provide enough on-chip bandwidth for high-speed special-purpose blocks to communicate with each other, while using much less die area than an FPGA to provide equivalent bandwidth.

Organization of the Inventive Network: The inventive network consists of a grid of stations that spans the entire field-programmable gate array (FPGA). The two-dimensional network formed by the stations is like a plane that is parallel to the two-dimensional routing crossbar network. These two parallel planes are analogous to the roadways in a city, where the network of freeways is parallel to the network of surface streets.

Figure 1:
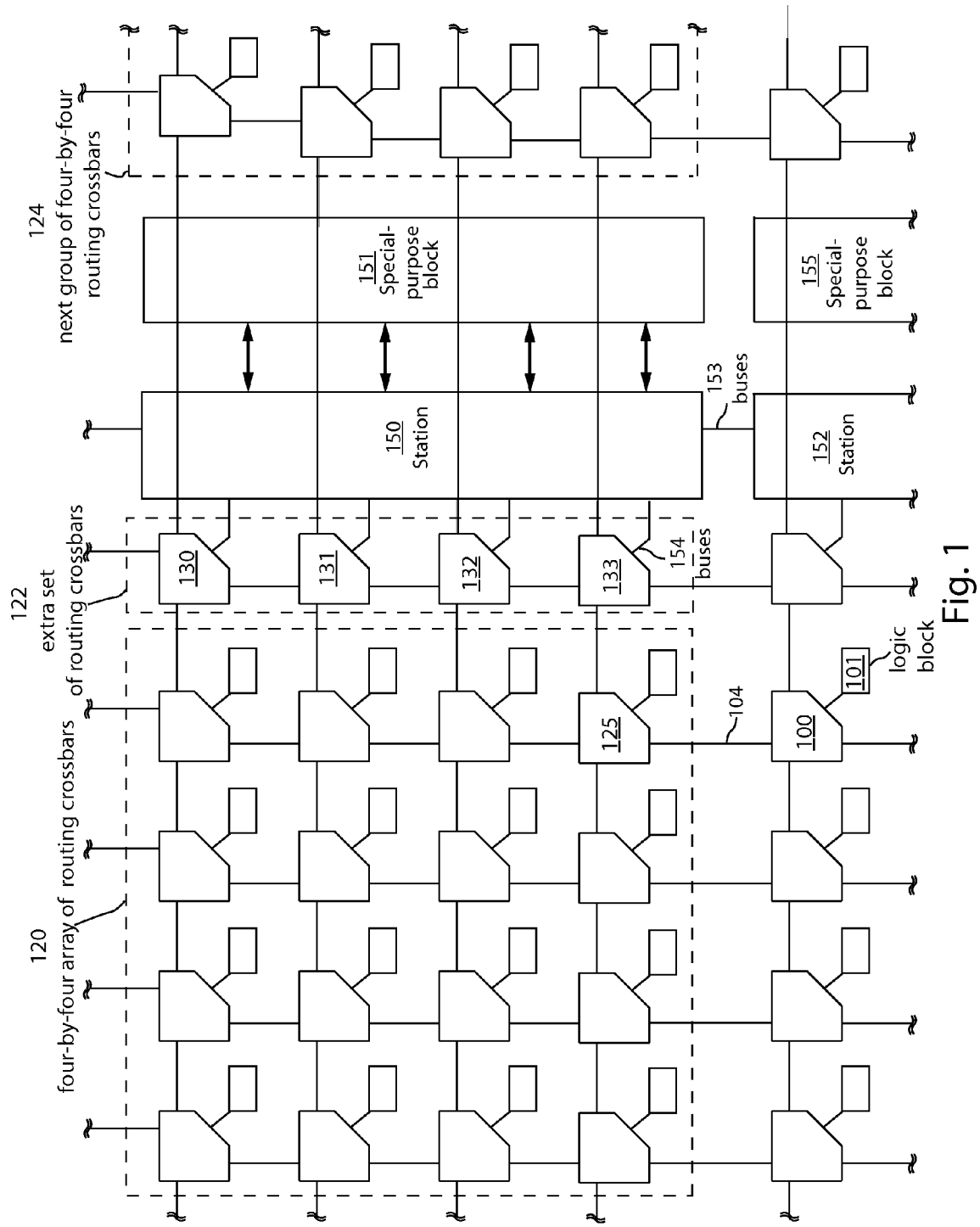
FIG. 1 illustrates the relationship of stations in the inventive network to a routing crossbar network and to special-purpose blocks.

FIG. 1 shows the relationship of stations to the routing crossbar network and to special-purpose blocks in one embodiment of the invention. The repeating unit in the routing crossbar network is a four-by-four array of routing crossbars 120, each with a logic block attached, plus an extra vertical set of four routing crossbars (such as routing crossbars 130-133). The four extra routing crossbars 122 connect the four-by-four segment of the routing crossbar network to the next group of four-by-four routing crossbars 124. The repeating unit in the inventive network is the station. Each station has direct connections to the nearest station above it, below it, and to the left and right of it. For example, station 152 is connected to the neighboring station 150 above it by buses 153. (Note that there are horizontal connections between stations, but FIG. 1 does not show them.) Typically, each station is connected to one repeating unit of the routing crossbar network. The station is connected to the four extra routing crossbars 122 at the routing crossbar ports which could otherwise be connected to logic blocks. For example, station 150 is connected to routing crossbar 133 by buses 154. Typically, each station is also connected to a special-purpose block. For example, station 150 is connected to special-purpose block 151 by buses. Multiplexers in the station give the special-purpose block access to the routing crossbar network as well as to the inventive network.

Computer-aided design (CAD) software routes a path through the inventive network by configuring switches in the stations. This is similar to the process of routing a signal through an FPGA routing network, such as the routing crossbar network. Unlike an FPGA network, the inventive network provides one stage of pipeline register at each station, which allows the data to flow at a very high rate.

Figure 2:
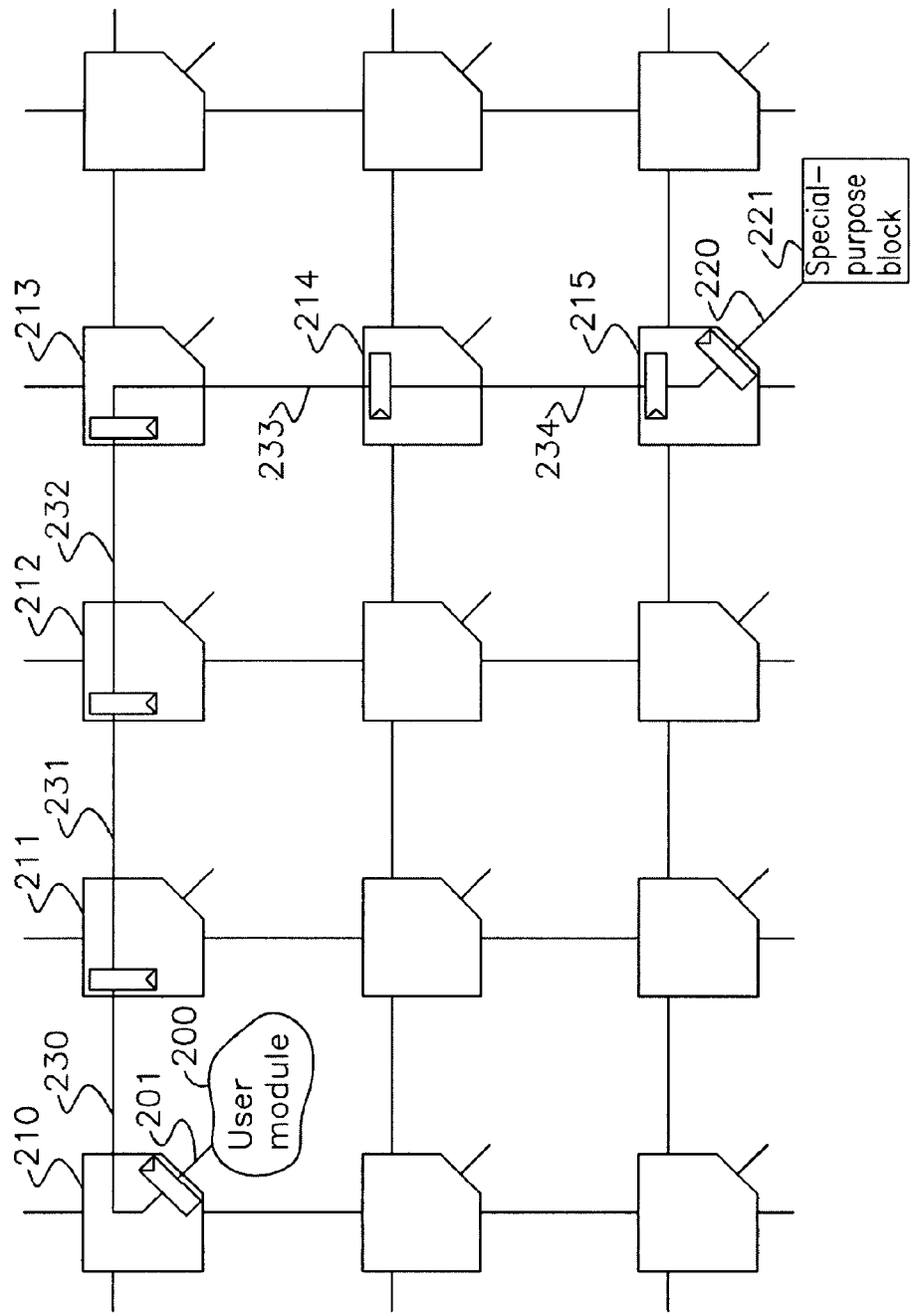
FIG. 2 illustrates a connection routed through stations in the inventive network.

FIG. 2 illustrates a connection routed through a series of stations 210-215 in the inventive network. User module 200 is implemented with logic blocks. User module 200 sends data into the inventive network through routing crossbar-to-station bus 201. In this example, the user module sends eighty-bit-wide data at two hundred MHz. Input-port logic in station 210 serializes the data to be ten bits wide at one thousand, six hundred MHz. Data travels from station to station over ten-bit buses 230-234 at one thousand, six hundred MHz, with one pipeline register at each station. At the destination station 215, output-port logic deserializes the data to be forty bits wide and presents it to special-purpose block 221 on bus 220 at four hundred MHz.

Figure 3:
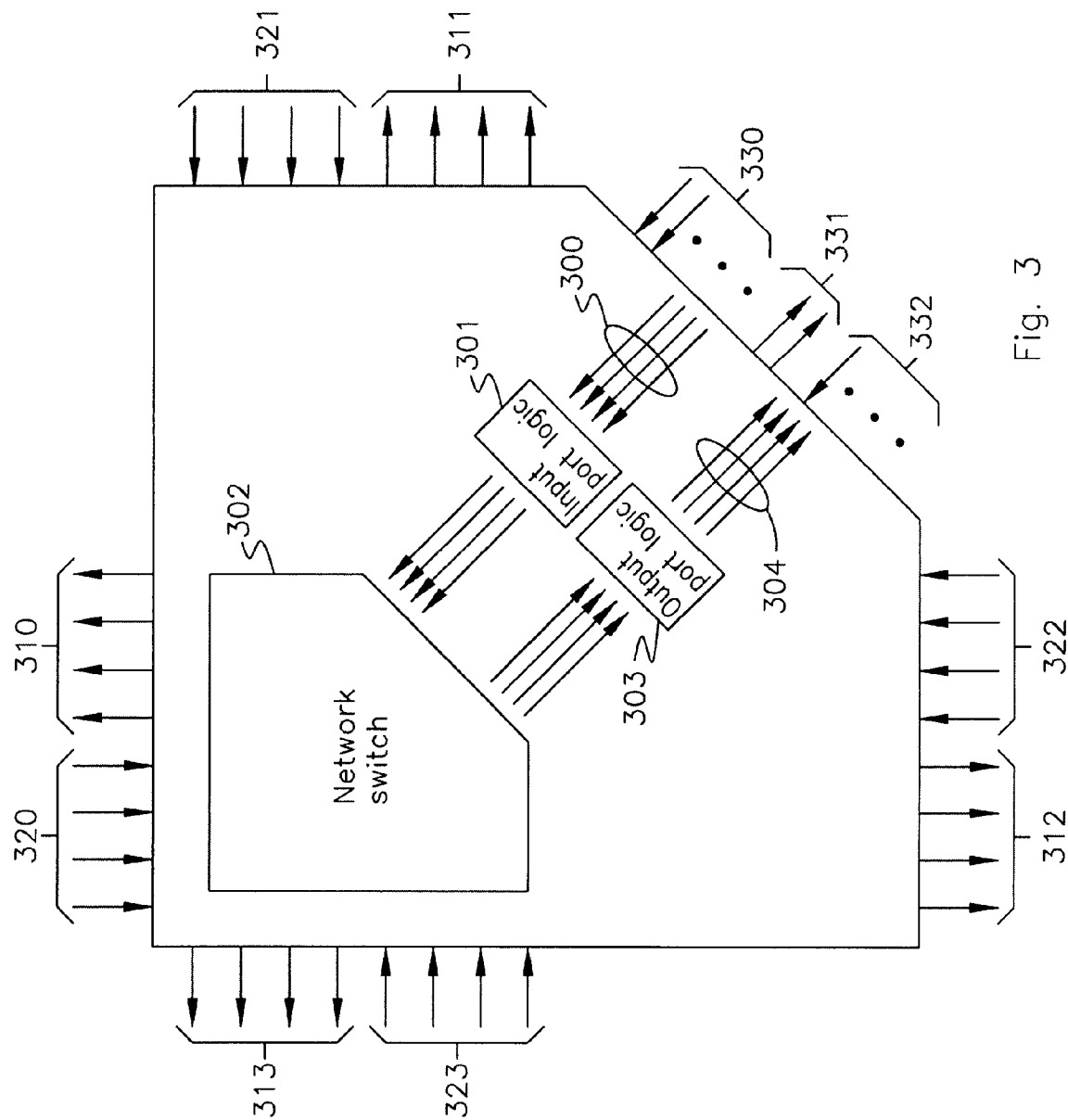
FIG. 3 shows a network-oriented view of a station.

Overview of a Station in the Inventive Network: FIG. 3 shows a network-oriented view of a station in the inventive network. It contains four twenty-bit input ports 300, input port logic 301 for processing input data, network switch 302 for passing data from station to station, output port logic 303 for processing output data, and four twenty-bit output ports 304. The station's external connections consist of sixteen five-bit output links 310-313 to neighboring stations, and sixteen five-bit input links 320-323 from neighboring stations, many input connections 330 from and output connections 331 to routing crossbars and a special-purpose block, and a small number of clock inputs 332. Some of the clocks operate at the frequencies of user logic and some operate at the faster internal frequencies of the inventive network.

Figure 4:
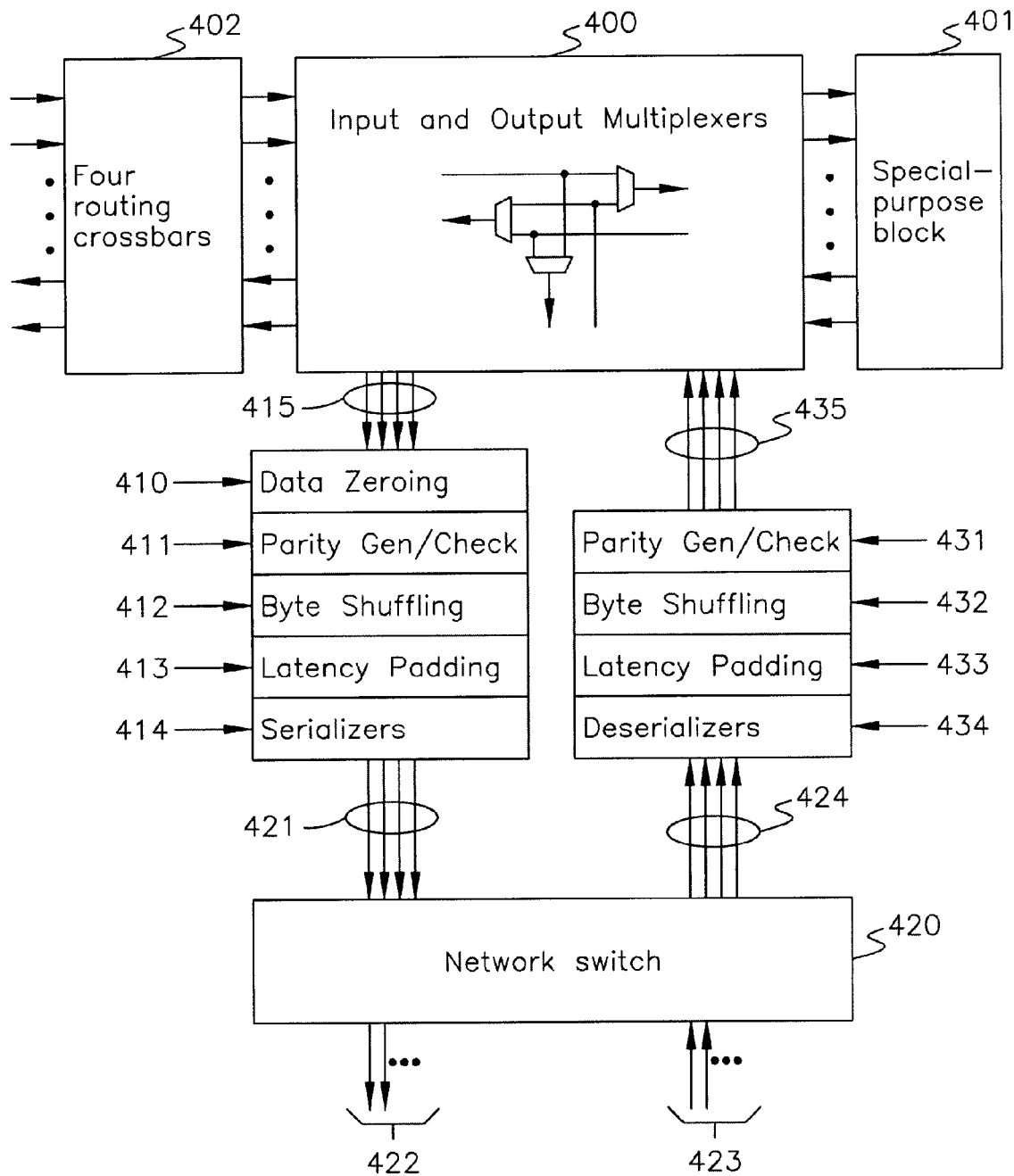
FIG. 4 is a block diagram of a station.

FIG. 4 is a block diagram of a station. A station includes input and output multiplexers 400, five layers of input port logic 410-414, a network switch 420, and four layers of output port logic 431-434.

The input and output multiplexers 400 give a special-purpose block 401 access to the routing crossbar network through four routing crossbars 402. The input and output multiplexers 400 connect both the special-purpose block 401 and the routing crossbars 402 to the input ports 415 and output ports 435 of the station. Each station has four twenty-bit input ports 415 and four twenty-bit output ports 435.

The input port logic 410-414 performs a series of functions: data zeroing, parity generation and checking, byte shuffling, latency padding, and serialization.

The data-zeroing logic 410 can dynamically or statically zero out five-bit portions of the twenty-bit user bus. This feature helps implement multiplexers in the inventive network and also allows the use of five, ten, or fifteen bits of the input port instead of all twenty bits.

The parity logic 411 can generate parity over nineteen bits or over two groups of nine bits, and it can check parity over all twenty bits or over two groups of ten bits. Output ports have similar parity logic 431, so parity can be generated or checked at both input ports and output ports.

By default, each twenty-bit input port will be serialized onto one five-bit bundle in the inventive network. This implies a default frequency ratio of 4:1 between the internal clock of the inventive network and the user port clock. When the user requires a 2:1 ratio, the byte-shuffling logic 412 can steer twenty bits of data from one user port toward two internal bundles.

The latency padding logic 413 can add up to fourteen user clock cycles of latency to an input port, and output ports have similar latency padding logic 433. CAD software uses this logic to pad the end-to-end latency through the inventive network to equal the value specified by the user, largely independent of the number of stations that the data has to pass through.

The last layer in the input port logic is the serializers 414, which serialize each twenty-bit input port at the user clock rate onto a five-bit internal bundle. In the preferred embodiment, internal bundles can be clocked at up to two GHz.

In FIG. 4, the network switch 420 is a partially populated crossbar switch. It routes five-bit bundles 421 from the four input ports to the sixteen station-to-station output links 422, from the sixteen station-to-station input links 423 to the sixteen station-to-station output links 422, and from the sixteen station-to-station input links 423 to the five-bit bundles 424 that feed the four output ports. (The sixteen station-to-station output links 422 correspond to elements 310-313 in FIG. 3, and the sixteen station-to-station input links 423 correspond to elements 320-323 in FIG. 3.) There is a multi-port OR gate at the root of each routing multiplexer in the switch. If a multiplexer is configured to allow more than one bundle into the OR gate, then the data-zeroing logic at the input ports determines which input bus is allowed through the OR gate. This lets the inventive network perform cycle-by-cycle selection for applications such as high-bandwidth multiplexers, user crossbar switches, and time-slicing a connection through the inventive network.

In FIG. 4, the output port logic 431-434 performs a series of functions that reverse the functions of the input port. The deserializer 434 distributes a five-bit internal bundle onto a twenty-bit output port at the user clock rate. The latency padding logic 433 can add up to fourteen user clock cycles of latency. Byte-shuffling logic 432 can steer data from one internal bundle toward two user output ports, which is often used with a 2:1 clock ratio. The parity logic 431 can generate parity over nineteen bits or two groups of nine bits, and it can check parity over twenty bits or two groups of ten bits. There is no data-zeroing logic in an output port.

Creating a Connection through the Inventive Network: To create a connection through the inventive network between two pieces of logic, the user selects logic models from a library provided by the manufacturer of the integrated circuit. CAD software converts the models to physical stations in the inventive network and routes a path through the inventive network. Beginpoint and endpoint models can be provided that have user bus widths in every multiple of five bits from five to eighty.

Figure 5:
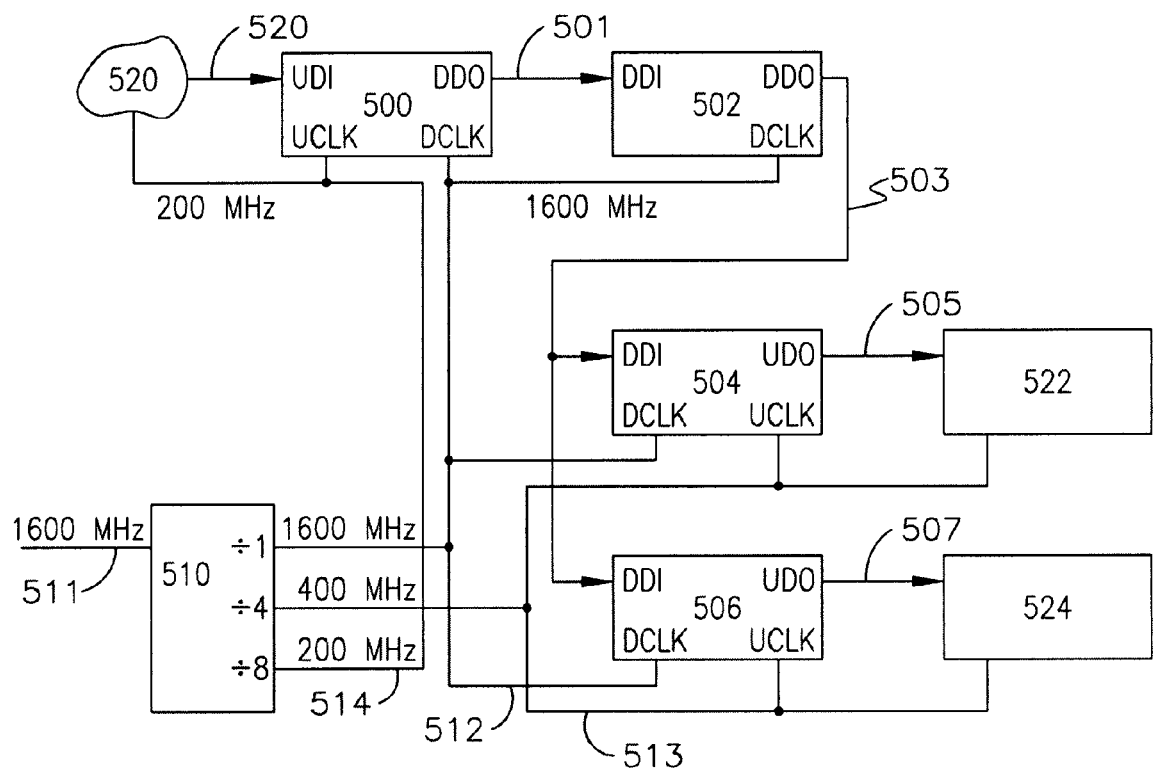
FIG. 5 is a simplified schematic diagram of a connection through the inventive network that has multiple destinations.

FIG. 5 is a simplified schematic diagram of a connection through the inventive network that has more than one destination. In this example, user module 520 is implemented with logic blocks. The user sends the output of module 520 to two destinations, parser ring 522 for header parsing and dual-port random-access memory (RAM) 524 for packet buffering. User module 520 in this example produces eighty-bit data 521 at two hundred MHz, and parser ring 522 and dual-port RAM 524 consume forty-bit data 505 and 507, respectively, at four hundred MHz. The data travels over the inventive network as two five-bit bundles at one thousand, six hundred MHz. The frequency ratio of internal clock 512 to user clock is 8:1 at the input to the network (signal 514) and 4:1 at the output from the network (signal 513).

The output bus 521 of user module 520 is connected to beginpoint module 500, which is chosen from a library of logic models for the cross-connection network for data (DCC network). A beginpoint module is a logic model for input ports of a station. The user input port is eighty bits wide and the clock division ratio is 8:1, so a beginpoint module is used that has an eighty-bit user input port and that serializes data at an 8:1 ratio. CAD software will route the user's eighty-bit bus through routing crossbars to all four input ports of a station and configure the station to steer the user's data onto two five-bit internal bundles.

The output 501 of beginpoint module 500 is connected to latency module 502. A latency module is a logic model for the end-to-end latency of a connection through the inventive network. This example uses a latency module whose input and output ports are both ten bits wide. The user sets a parameter on latency module 502 to tell software the desired end-to-end latency of the connection. After the design is placed and routed, software can pad out the latency at the input and output ports if the routed delay through the sequence of physical stations is less than the user-specified latency.

Output 503 of latency module 502 is connected to endpoint modules 504 and 506, one for each of the two destinations. An endpoint module is a logic model for output ports of a station. This example uses endpoint modules that have a forty-bit user output port and that deserialize data at a 4:1 ratio, because the user output ports 505 and 507 are forty bits wide and the clock division ratio is 4:1. At each destination station, software will steer the data from two five-bit internal bundles to two of the four output ports of the station, and from there directly to the special-purpose block (522 or 524).

The field-programmable gate array (FPGA) containing the inventive network has a clock distribution network with built-in clock dividers. In the proposed embodiment, the dividers can create any integer clock ratio from 1:1 to 16:1. For a connection through the inventive network, the internal clock is typically at a 1:1 ratio to the root of a clock tree. The user clocks are divided down from the same root. The clock distribution network ensures that any clocks divided down from the same root are aligned and have low skew. This guarantees synchronous interfacing between the user clock domain and the internal clock domain. In the example of FIG. 5, the root 511 of the clock tree operates at one thousand, six hundred MHz. The clock tree divides down root 511 by a 1:1 ratio to produce internal clock 512 at one thousand, six hundred MHz. The clock tree divides down root 511 by 4:1 and 8:1 ratios to produce user clocks 513 and 514, respectively, at four hundred MHz and two hundred MHz, respectively.

Different connections in the inventive network can use different clock trees. For example, a design can use a one thousand, six hundred MHz root clock for some connections and a one thousand, two hundred fifty MHz root clock for others.

After placement and routing the user's data will travel through a sequence of stations, but those stations do not appear in the user's netlist. The actual latency through the inventive network is simulated by the begin, latency, and end modules that the user selects, such as modules 500, 502, 504, and 506 in FIG. 5. This is similar to the routing of a signal through the routing crossbar network; back-annotation represents the delay of the routed signal, but the routing switches do not appear in the user's netlist.

Uses of the Inventive Network: The hardware characteristics of the inventive network make various uses possible.

The simplest use of the inventive network is a point-to-point connection between two pieces of user logic having the same bus width and clock frequency. For example, suppose that the integrated circuit includes a special-purpose block that performs the media access control (MAC) function for a ten Gbps Ethernet connection, and a ring of special-purpose blocks that can be programmed to perform simple parsing of Ethernet frames. Suppose further that the output bus from the MAC block for received frames is forty bits wide (including data and tag bits) and has a clock frequency of three hundred fifty MHz. Suppose further that the input bus to the parser ring also is forty bits wide and also clocks at three hundred fifty MHz. In this example, the user can send data from the media access control (MAC) block to the parser ring over the inventive network by using an internal clock frequency in the network of one thousand, four hundred MHz. MAC data enters the inventive network through two twenty-bit input ports near the MAC block. The input data is serialized at a 4:1 ratio onto two five-bit internal bundles. The ten-bit-wide internal data travels a configured path through a series of stations in the inventive network at one thousand, four hundred MHz. At two output ports of a station near the parser ring, the data is deserialized at a 4:1 ratio onto two twenty-bit buses and presented to the parser ring at three hundred fifty MHz.

Another use of the inventive network is a point-to-point connection between two pieces of user logic that have the same data rate but different bus widths and clock frequencies. This bandwidth-matching is made possible by the independently configurable serializer and deserializer ratios in the input port and output port, respectively. For example, consider the schematic diagram in FIG. 5. User module 520 sends eighty-bit data at two hundred MHz into beginpoint module 500, which is a logical representation of four twenty-bit input ports. The input data is serialized at an 8:1 ratio onto two five-bit internal bundles. The ten-bit-wide internal data travels a configured path through a series of stations at one thousand, six hundred MHz. At endpoint module 506, which is a logical representation of two twenty-bit output ports, the output data is deserialized at a 4:1 ratio onto two twenty-bit buses and presented to dual-port RAM 524 at four hundred MHz. The data rate is sixteen thousand Mbps throughout the path: eighty bits times two hundred MHz leaving the user module, ten bits times one thousand, six hundred MHz inside the inventive network, and forty bits times four hundred MHz entering the dual-port RAM.

The inventive network can fan out data from one source to multiple destinations. Network switch 420, shown in FIG. 4, makes this possible. A data bundle can enter the switch through one of the input links 423 or one of the input ports 421. The network switch can send the bundle to more than one output bundle among output links 422 and output ports 424. FIG. 5 illustrates a connection with multiple destinations. In this example, the user sends data from user module 520 to two destinations, parser ring 522 and dual-port RAM 524.

Figure 15:
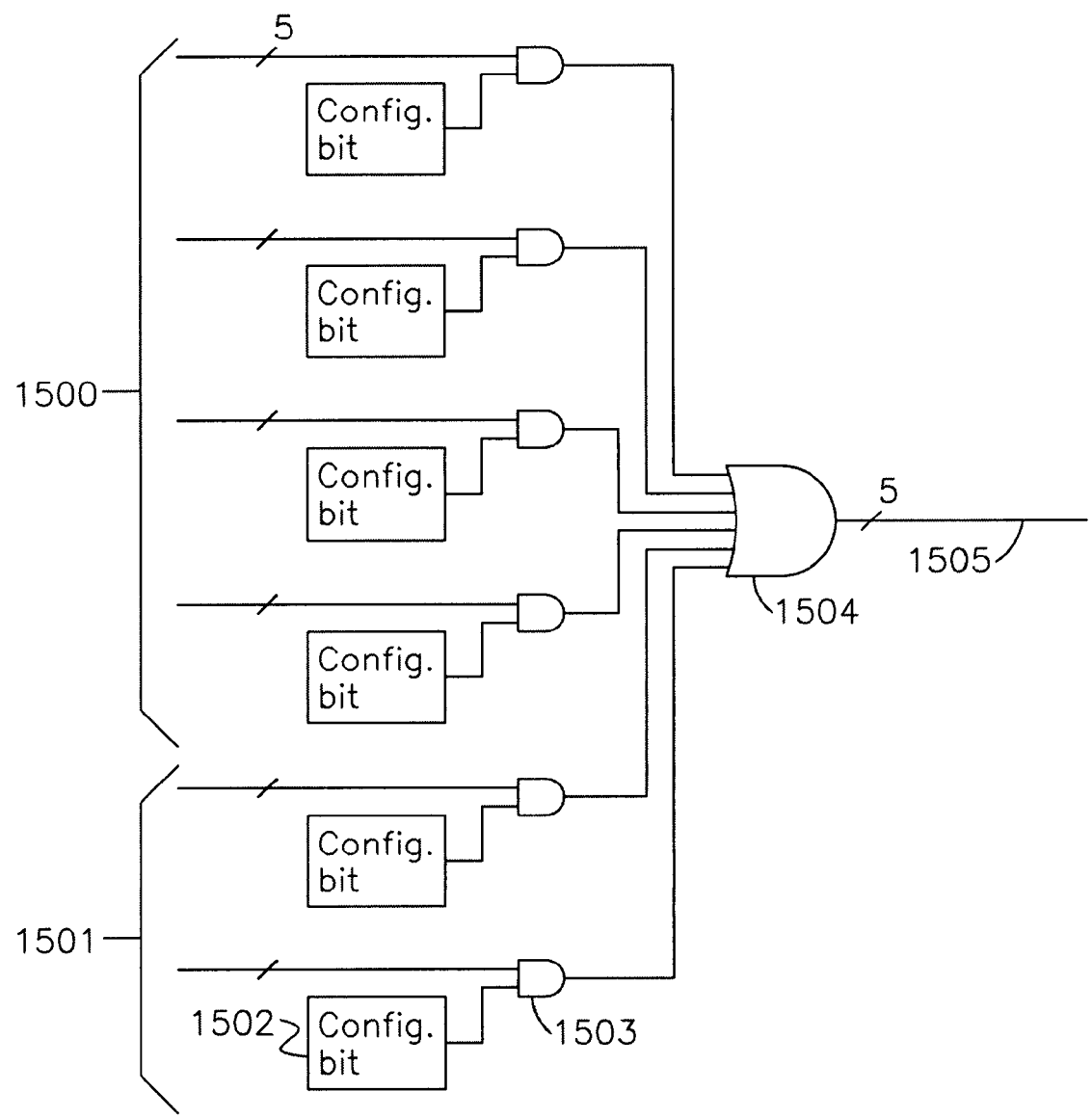
FIG. 15 shows a routing multiplexer for an output link of network switch.

As well as transporting data at a high bandwidth, a connection through the inventive network can implement a high-bandwidth user multiplexer. This function relies on two features of the hardware. The first feature is the data zeroing logic 410 in an input port of a station (see FIG. 4). An input port can be configured to allow a user input signal to zero out the port's twenty-bit bus on a cycle-by-cycle basis. The second feature is that the routing multiplexers in a network switch can OR together two or more five-bit bundles of data. As shown in FIG. 15, a routing multiplexer consists of multiple AND gates that feed into an OR gate. Configuration memory bits can enable two or more of the AND gates in the multiplexer, which causes two or more input bundles to be ORed together onto an output bundle. To implement a high-bandwidth user multiplexer, computer-aided design (CAD) software routes bundles corresponding to two or more user multiplexer input buses to a routing multiplexer in the network switch of some station. Within that network switch, CAD software enables the AND gates that correspond to all of those bundles, thereby ORing the bundles together. The user connects their multiplexer input buses to separate input ports and provides a control signal to each port to function as the select signals for the user multiplexer.

A user can combine fanout and high-bandwidth multiplexing in one connection through the inventive network. That is, a connection can have multiple user input buses, with each bus enabled cycle-by-cycle by a separate control signal. The connection can OR the user data together, thereby forming a high-bandwidth user multiplexer. The output data of the user multiplexer can be fanned out to multiple user output destination buses. Multiple such connections can be used to implement a non-blocking user crossbar, in which multiple user output buses can independently receive data from a cycle-by-cycle choice of multiple input buses.

Figure 8:
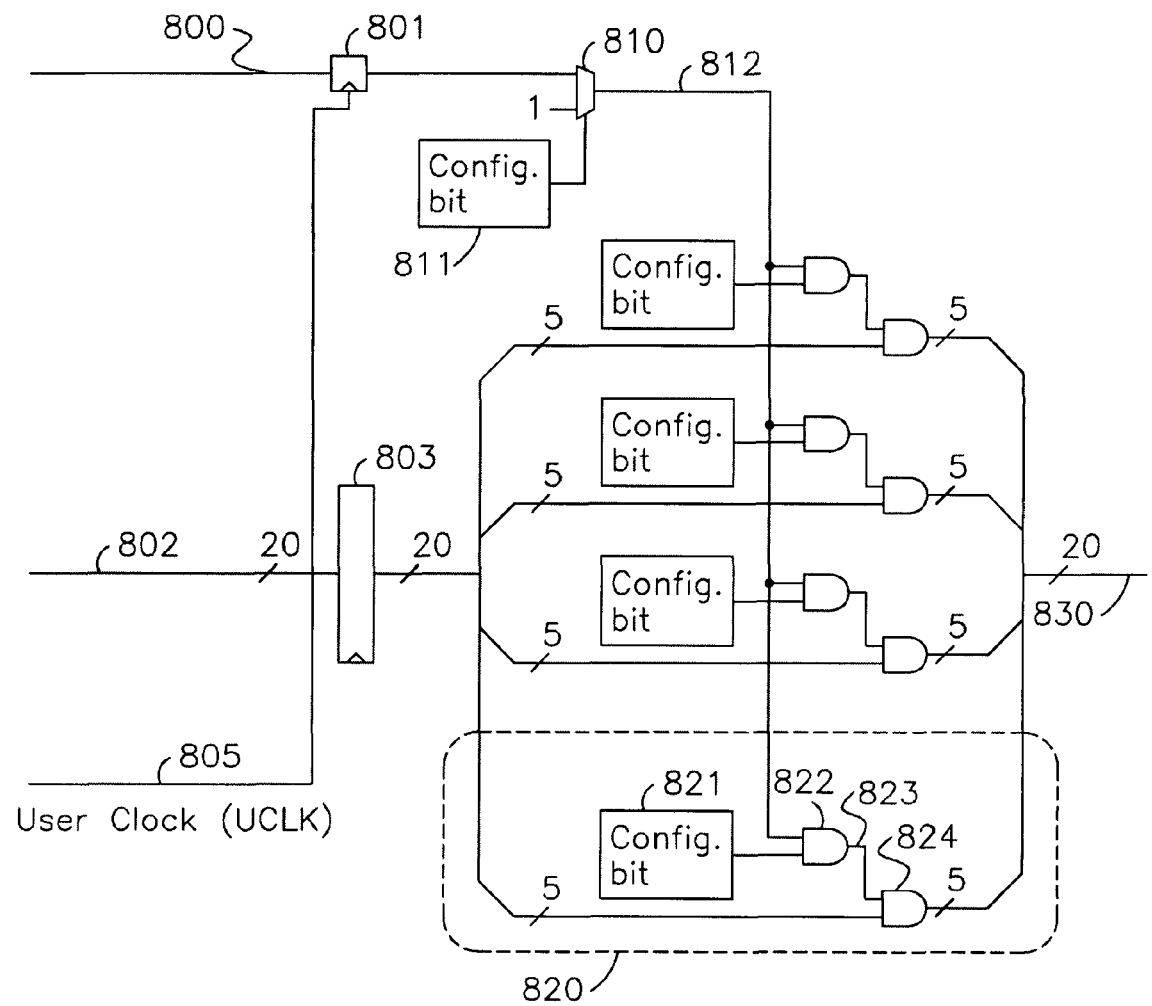
FIG. 8 shows data zeroing logic for one input port.

A connection through the inventive network can time-slice data from two or more input ports onto one internal bundle. This function can be used to time-division-multiplex two or more user buses, each of which does not need the full bandwidth of a bundle, onto one bundle. This function can also be used to concatenate two or more user buses that originate at widely separated locations on the integrated circuit. This function relies on the data zeroing logic, the serializer and deserializer, and the ORing function of the network switch. For example, suppose that the user wishes to time-slice two ten-bit user buses A and B onto one five-bit internal bundle. The user connects ten-bit buses A and B to separate input ports of the inventive network and connects an output port to twenty-bit user bus C. The user connects bus A[9:0] to bits [9:0] of its input port, and bits [19:10] of the port are forced to 0 by configuration memory. (FIG. 8 shows the configuration memory bits in the data zeroing logic that perform this function.) The user connects bus B[9:0] to bits [19:10] of its input port, and bits [9:0] of the port are forced to 0 by configuration bits. The serializers in both input ports are configured to serialize at a frequency ratio of 4:1. For each user clock cycle, the sequence of five-bit nybbles on the output of bus A's serializer is A[4:0], A[9:5], 0, 0, and the sequence of nybbles on the output of bus B's serializer is 0, 0, B[4:0], B[9:5]. CAD software routes the output bundles of the two serializers to a network switch in some station of the inventive network, where it ORs them together. The sequence of nybbles on the ORed-together bundle is therefore A[4:0], A[9:5], B[4:0], B[9:5]. The combined bundle is routed to an output port and deserialized at 4:1. Twenty-bit output bus C displays B[9:0] concatenated with A[9:0] on every cycle.

The output of a connection through the inventive network can be used in a time-sliced fashion as well. In the example described in the preceding paragraph, the combined bundle can be routed to two output ports of the network. At one output port, the user can ignore bits [19:10] of the port and receive bus A from bits [9:0]. At the other output port, the user can ignore bits [9:0] of the port and receive bus B from bits [19:10].

CAD software can implement fixed, user-specified end-to-end latency in a connection through the inventive network, largely independent of the number of stations that the data passes through. For example, when the user sends a data bus through the inventive network while sending control signals through the routing crossbar network, it may be important to have the same number of cycles of latency along both paths. This function uses the latency padding logic in input ports and output ports of the inventive network. When defining a connection through the inventive network, the user sets a parameter on the latency module (such as latency module 502 in FIG. 5), to tell CAD software the desired end-to-end latency. After the design is placed and routed, CAD software can pad out the latency at the input and output ports if the routed delay through the sequence of physical stations is less than the user-specified latency.

The inventive network can detect single-bit errors in user logic or in a connection through the inventive network, thanks to the parity generation and checking logic found in both input ports and output ports. To detect parity errors in user logic, such as a RAM special-purpose block, the user can provide input data to the RAM from an output port of the inventive network that has parity generation enabled. If the output data from the RAM goes to an input port that has parity checking enabled, then the input port detects any single-bit errors that occurred on the data while it was stored in the RAM. To detect single-bit errors that occur while data is traveling through the inventive network, the user can enable parity generation in the connection's input port and parity checking in the connection's output port.

Further Details of the Input and Output Connections: Stations in the inventive network connect the routing crossbar network to the inventive network and connect both of them to special-purpose blocks. As FIG. 1 shows, each station, such as station 150, is attached to four routing crossbars, such as routing crossbars 130-133, which are part of the routing crossbar network. A special-purpose block, such as special-purpose block 151, gets access to those routing crossbars through the input and output connections of the station.

Figure 6:
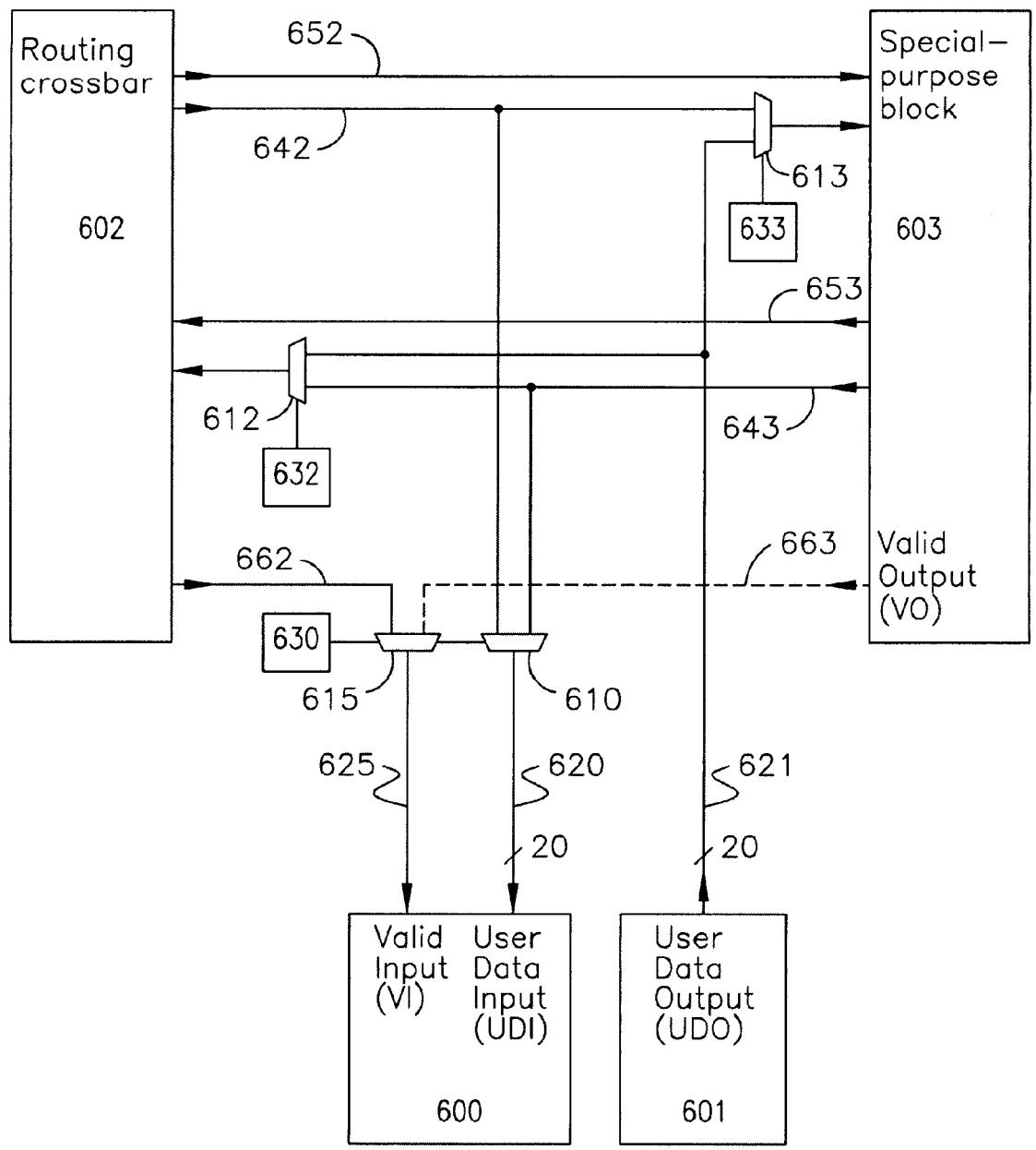
FIG. 6 shows input and output connections for one input port and one output port.

A station has four twenty-bit input ports and four twenty-bit output ports. Each pair of ports, consisting of one input port and one output port, has its own set of input and output connections. The connections for one pair of ports are completely independent of the other pairs. FIG. 6 shows the input and output connections for one pair of ports. There are three types of Connections: input multiplexers that drive the input port, output multiplexers that drive the routing crossbar and the special-purpose block, and feedthrough connections between the routing crossbar and the special-purpose block. All of the multiplexers are controlled by configuration memory.

Input multiplexers 610 and 615 drive the first layer of the station's input port, which is the data zeroing logic 600. The twenty-bit, two-port multiplexer 610 and the one-bit, two-port multiplexer 615 select the User Data Input (UDI) bus 620 and the Valid Input (VI) control signal 625, respectively, from either routing crossbar 602 or special-purpose block 603. Both multiplexers are controlled by the same configuration memory bit 630, so either UDI and VI both come from the routing crossbar or both come from the special-purpose block. Not all special-purpose blocks have a dedicated output signal 663 to indicate that the twenty-bit data word is valid. For information on the Valid Input (VI) signal, see the description under subsection "Further Details of the Input Port Logic."

The twenty-bit, two-port output multiplexer 612 drives routing crossbar 602, and the twenty-bit, two-port output multiplexer 613 drives special-purpose block 603. These multiplexers are controlled by independent configuration memory bits 632 and 633, respectively. The last layer of the station's output port, which is the parity generation and checking logic 601, drives the User Data Output (UDO) bus 621. UDO fans out to both output multiplexers. The output multiplexer 612 that drives routing crossbar 602 selects between UDO 621 and the same twenty-bit bus 643 from the special-purpose block that drives input multiplexer 610. Similarly, the output multiplexer 613 that drives special-purpose block 603 selects between User Data Output (UDO) 621 and the same twenty-bit bus 642 from the routing crossbar that drives input multiplexer 610.

In addition to the multiplexers, there are feedthrough signals 652 from the routing crossbar 602 to the special-purpose block 603 and feedthrough signals 653 from the special-purpose block to the routing crossbar. None of the feedthrough signals has a connection to the input or output port of the station. Therefore, although all bits of the routing crossbar's outputs (except for signal 662 to the Valid Input (VI) input multiplexer 615) have some path to the special-purpose block, only twenty bits have a path to the input port. Similarly, all bits of the special-purpose block's outputs (except for Valid Output (VO) signal 663 to the VI input multiplexer 615) have some path to the routing crossbar, but only twenty bits have a path to the input port.

Note that the input and output multiplexers operate on twenty bits as a unit. For example, there is no way to select the high ten bits of the input port from the routing crossbar and the low ten bits from the special-purpose block.

A station is connected to four routing crossbars and therefore has four copies of the input and output connections that are shown in FIG. 6. A typical special-purpose block, such as a dual-port RAM, is connected to one station, which in turn connects it to four routing crossbars.

Further Details of the Input Port Logic: The input port logic of each station is depicted by elements 410-414 in FIG. 4. More detail is provided by FIG. 7, which is a block diagram of the input port logic. Each group of buses 415 and 720-723 consists of four buses. Each of the buses is twenty bits wide and clocked by a user clock. Buses 724 consist of four buses; each of the buses, also referred to herein as bundles, is five bits wide and clocked by an internal clock of the inventive network.

Input multiplexers 700 drive the four twenty-bit input buses 415. Buses 415 drive data zeroing logic 410, which consists of four data zeroing units 710a-710d, one for each port. Data zeroing units 710a-710d drive the four twenty-bit buses 720. Buses 720 drive parity generation and checking logic 411, which consists of four parity generation and checking units 711a-711d, one for each port. Parity units 711a-711d drive the four twenty-bit buses 721. Buses 721 drive byte shuffling logic 412, which can steer data from one port to another port. Byte shuffling logic 412 drives the four twenty-bit buses 722. Buses 722 drive latency padding logic 413, which consists of four latency padding units 713a-713d, one for each port. Latency padding units 713a-713d drive the four twenty-bit buses 723. Buses 723 drive serializers 414, which consist of four serializers 714a-714d, one for each port. Serializers 714a-714d drive the four five-bit bundles 724. Bundles 724 drive network switch 420.

FIG. 8 shows the data zeroing logic for one input port, such as data zeroing unit 710a. The data zeroing logic for a port has three functions: to register the user's input data; to statically set the width of the port; and to allow the user's logic to zero out the entire port on a cycle-by-cycle basis.

The user's input data for the port is twenty-bit bus 802, which is one of the four buses 415 driven by input multiplexers 700. Bus 802 is captured by register 803, which is clocked by user clock 805. The output of register 803 is treated as four independent five-bit nybbles. Element 820 is the logic for a representative nybble. The output nybbles are concatenated to form twenty-bit bus 830, which drives the port's parity generation and checking logic.

The port also has one-bit Valid Input (VI) signal 800. Signal 800 is captured by register 801, which is clocked by user clock 805.

An input port can be configured to be five, ten, fifteen, or twenty bits wide. Each of the port's four nybbles has a configuration memory bit that forces the entire nybble to 0 if the nybble is unused. In representative nybble 820, AND gates 824 consist of five two-input AND gates, where the first input of each gate is driven by signal 823 and the second input is driven by one of the bits of the nybble. If the nybble is unused, configuration bit 821 is programmed to 0. This forces output 823 of AND gate 822 to 0, which in turn forces the outputs of all five AND gates 824 to 0.

If the user wants to be able to zero out the entire port on a cycle-by-cycle basis, then configuration memory bit 811 is programmed to pass the output of register 801 through multiplexer 810 to signal 812. If Valid Input (VI) signal 800 is 0, then signal 812 is 0 during the following cycle. That forces a 0 onto output 823 of AND gate 822 and onto the outputs of the other three like AND gates. That in turn forces 0 onto the output of AND gates 824 and the other three like sets of AND gates, regardless of the value of configuration bit 821 and the other three like configuration bits. On the other hand, if VI signal 800 is 1, then signal 812 is 1 during the following cycle, and the five-bit nybbles pass through the data zeroing logic unchanged unless the nybble's individual configuration bit, such as configuration bit 821, is 0.

If the user wants Valid Input (VI) signal 800 to be ignored and wants the port to be enabled on every cycle, then configuration memory bit 811 can be programmed to pass a constant 1 through multiplexer 810 to signal 812.

Figure 9:
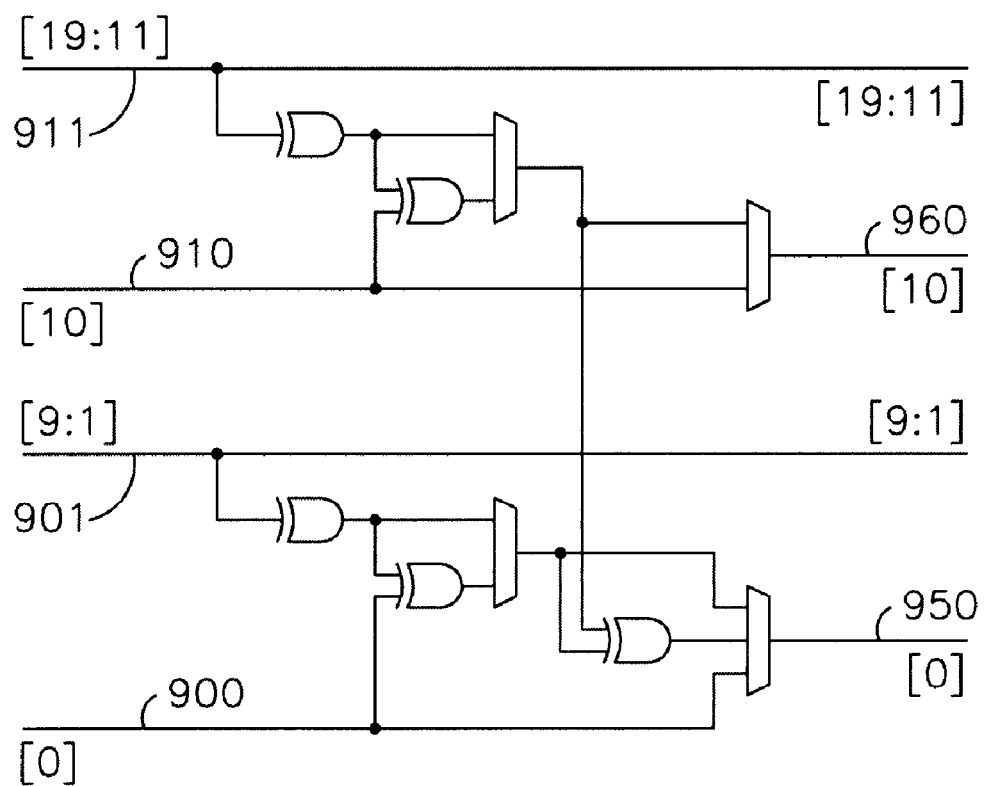
FIG. 9 shows parity generation and checking logic for one input port.

FIG. 9 is a schematic diagram of the parity generation and checking logic for one input port, such as parity unit 711a. It can be configured for bypass (leaving all twenty bits unchanged), parity generation, or parity checking. The parity logic can be configured to operate on all twenty bits as a group or on the two ten-bit bytes as independent groups.

Figure 7:
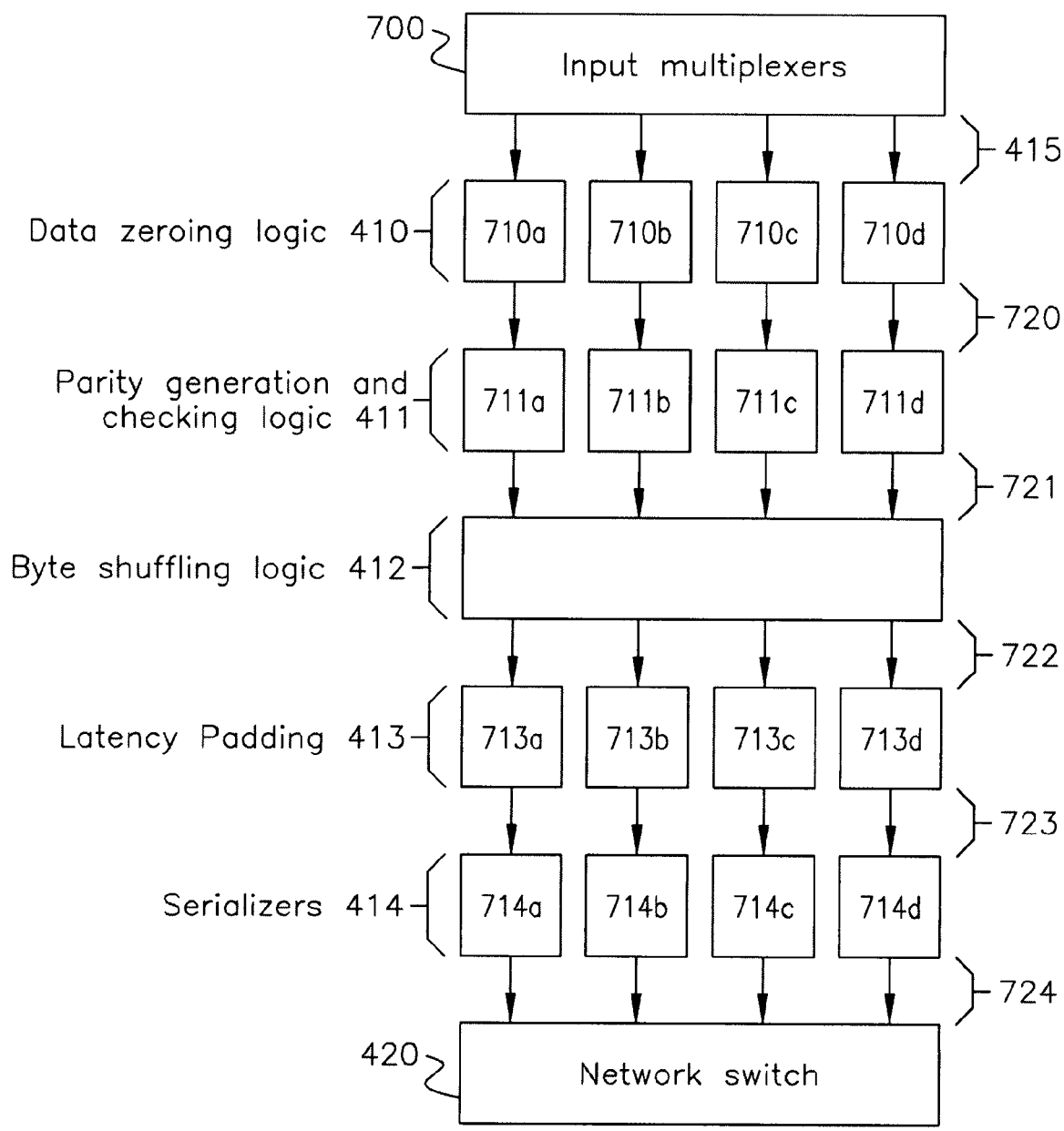
FIG. 7 is a block diagram of the input port logic of a station.

The twenty-bit input to the parity unit is one of the four buses 720 driven by one of the four data zeroing units 710a-710d (see FIG. 7). The low-order input byte consists of bit 0 900 and bits 9:1 901, and the high-order input byte consists of bit 10 910 and bits 19:11 911. The high nine bits of both bytes (bits 9:1 901 and bits 19:11 911) always pass through the parity logic unchanged. The twenty-bit output of the parity unit (bit 0 950, bits 9:1 901, bit 10 960, and bits 19:11 911) drive the station's byte shuffling logic.

To generate parity, the logic computes the exclusive-OR (XOR) of the high nineteen bits or nine bits of the parity group and injects the computed parity on the low-order bit of the group (bit 0 950 in twenty-bit mode or bit 10 960 and bit 0 950 in ten-bit mode). To check parity, the logic computes the XOR of all twenty bits or ten bits of the parity group and injects the error result on the low-order bit of the group; the result is 1 if and only if a parity error has occurred.

The multiplexers in FIG. 9 are controlled by configuration memory. The multiplexers determine whether the parity logic operates in bypass, generate, or check mode. The multiplexers also determine whether the parity logic operates in twenty-bit mode or ten-bit mode.

The byte shuffling logic is the only layer of the input logic where the four ports can exchange data with each other. Its main function is to support a 2:1 frequency ratio between an internal clock of the inventive network and a user clock. For all other frequency ratios, computer-aided design (CAD) software configures this logic to pass the twenty bits of each port straight through on the same port.

Figure 10:
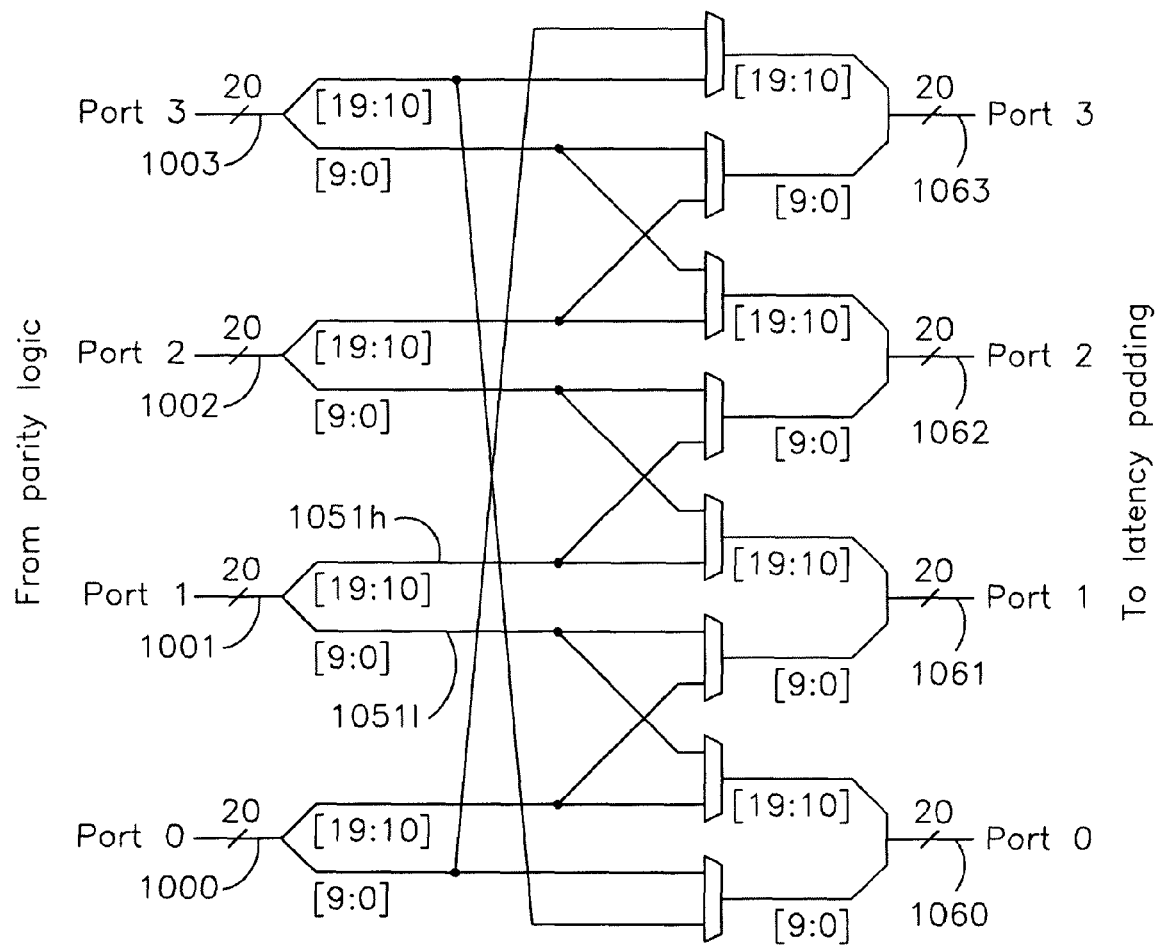
FIG. 10 shows byte shuffling logic for input ports of a station.

FIG. 10 shows the byte shuffling logic for all four input ports; the multiplexers in the figure are controlled by configuration memory. The byte shuffling unit has one twenty-bit input bus 1000-1003 for each of ports 0-3, respectively. These input buses are the four buses 721 in FIG. 7, which are driven by the four parity units 711a-711d. The byte shuffling unit has one twenty-bit output bus 1060-1063 for each of ports 0-3, respectively. These output buses drive the four latency padding units 713a-713d (see FIG. 7).

The byte shuffling logic treats each port as two ten-bit bytes. For example, port 1's input bus 1001 consists of low-order byte 1051l and high-order byte 1051h. Configurable multiplexers either keep the low-order byte of port i on port i, or steer it to the high-order byte position of port i−1 (mod 4). For example, multiplexers either direct port 1's low-order input byte 1051l to port 1's output bus 1061, or steer it to the high-order byte of port 0's output bus 1060. Similarly, the multiplexers either keep the high-order byte of port i on port i, or steer it to the low-order byte position of port i+1 (mod 4). For example, multiplexers either direct port 1's high-order input byte 1051h to port 1's output bus 1061, or steer it to the low-order byte of port 2's output bus 1062.

The 2:1 frequency ratio works with byte shuffling as follows. Each twenty-bit input port, clocked at a user clock frequency, is associated with a five-bit internal bundle, clocked at the faster frequency of the internal clock of the inventive network. When the ratio of internal clock to user clock is 2:1, only ten bits of the twenty-bit port can be serialized onto the five-bit bundle. If all twenty bits of the port are in use, the byte shuffling multiplexers keep ten bits within the given port and steer the other ten bits to an adjacent port. Therefore, the twenty bits that originally came into the port will be serialized onto two five-bit internal bundles.

Each input port has latency padding logic, such as latency padding unit 713a in FIG. 7. CAD software can use this logic to pad the end-to-end latency through the inventive network to equal the value specified by the user.

Figure 11:
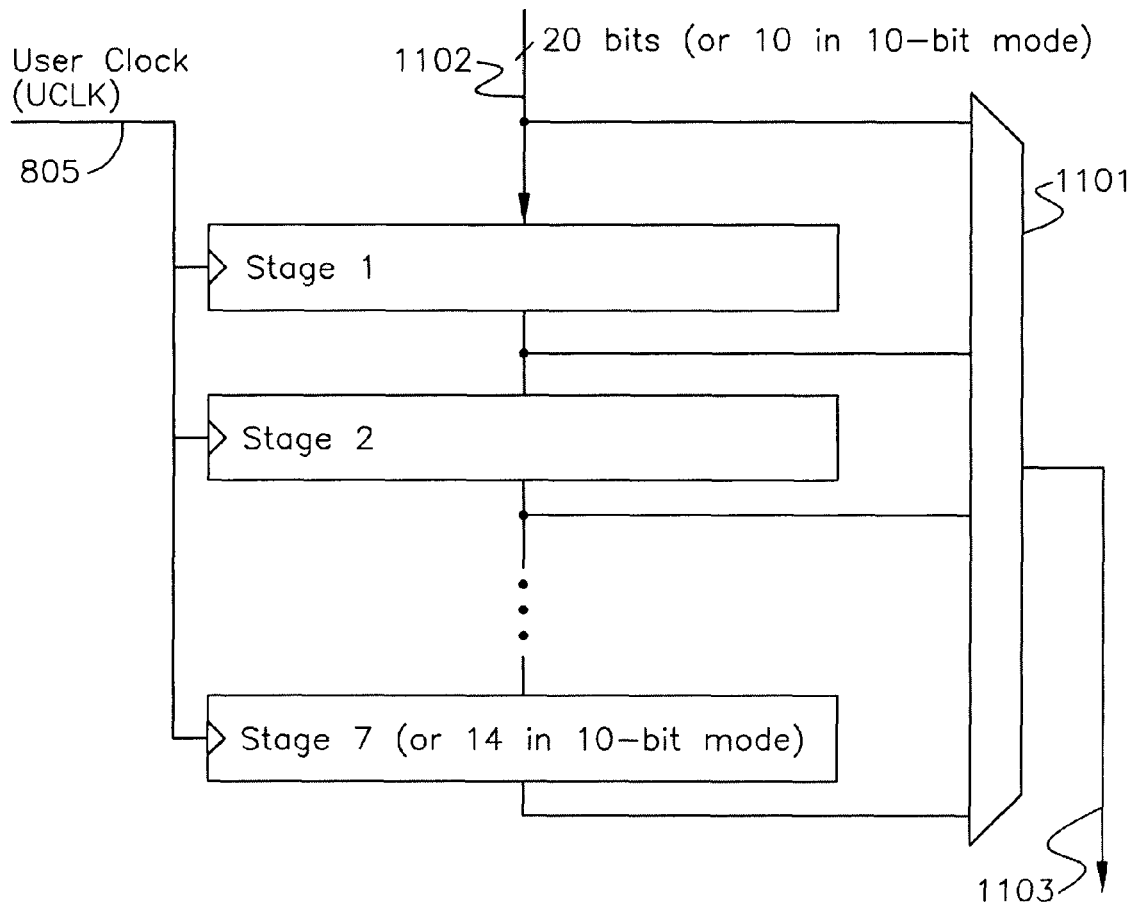
FIG. 11 is a schematic diagram of the effective behavior of the latency padding logic for one input port.

FIG. 11 is a schematic diagram of the effective behavior of the latency padding logic for one input port, such as latency padding unit 713a. It behaves as a shift register that is clocked by user clock 805. The effective shift register depth is determined by the configuration memory bits that control multiplexer 1101. The twenty-bit input 1102 to the latency padding unit is one of the four buses 722 driven by the byte shuffling logic (see FIG. 7). The twenty-bit output 1103 drives the port's serializer.

The logic can be configured to behave like a twenty-bit-wide shift register with zero to seven stages or like a ten-bit-wide shift register with zero to fourteen stages. When the logic is configured as a zero-stage shift register, it passes data through from input bus 1102 to output bus 1103 without any register delays. The deeper-and-narrower fourteen-by-ten configuration is useful when only ten bits or five bits of the port are meaningful, which is the case when the frequency ratio between the internal clock of the inventive network and the user clock is 2:1 or 1:1.

Figure 12:
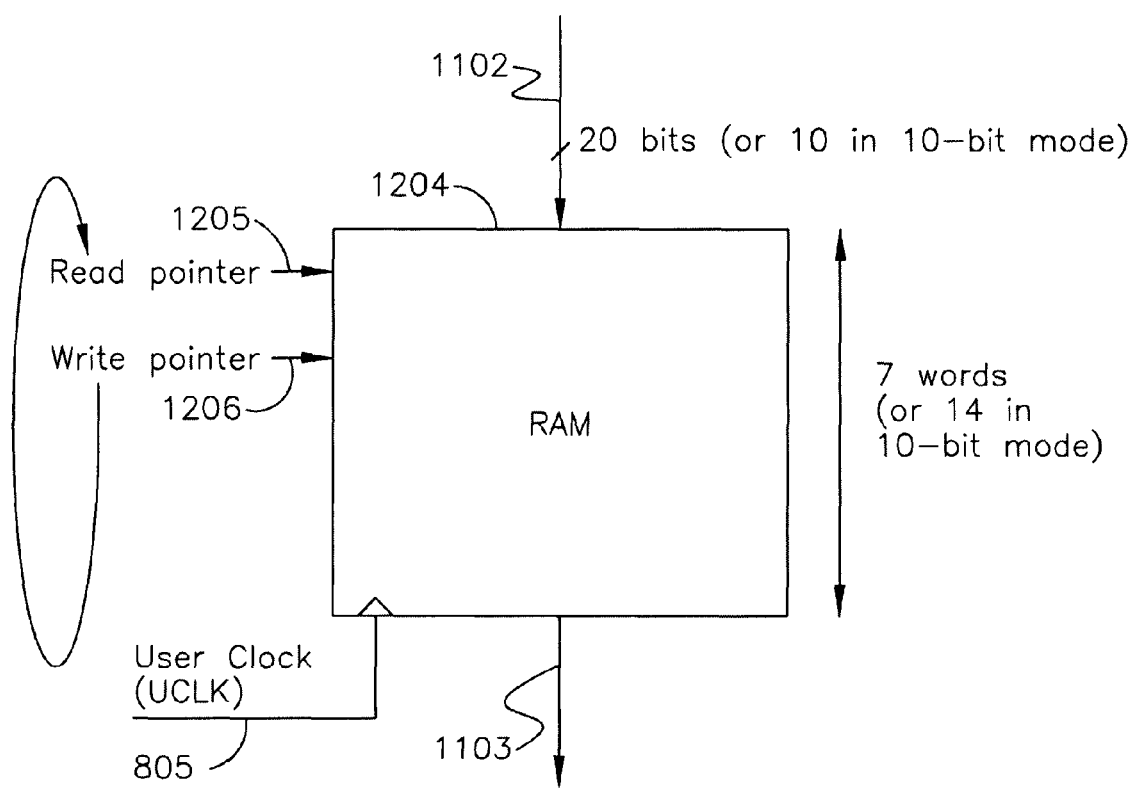
FIG. 12 summarizes the preferred embodiment of the latency padding logic for one input port.

FIG. 12 summarizes the preferred embodiment of the latency padding logic. Twenty-bit input data 1102 from the byte shuffling logic is written into a seven-word by twenty-bit RAM 1204 on every cycle of user clock 805, and twenty-bit output data 1103 for the serializer is read from RAM 1204 on every cycle.

Random-access memory (RAM) 1204 has separate write bit lines and read bit lines. During the first half of the cycle, the write bit lines are driven with write data, the read bit lines get precharged, and the output latches are held closed so they retain the results of the previous read. During the second half of the cycle, RAM bit cells can pull down the read bit lines, and the output latches are held open so they can capture the values from the sense amplifiers.

The RAM addresses are furnished by read pointer 1205 and write pointer 1206. The pointers are implemented by identical state machines that have a set of states that form a graph cycle. The state machines can be configured with different initial states, and they advance to the next state at every cycle of user clock 805. As pointers 1205 and 1206 "chase" each other around RAM 1204, the effect is that RAM 1204 delays its input data by a fixed number of cycles. In the preferred embodiment, the state machines are three-bit linear feedback shift registers (LFSRs) that have a maximal-length sequence of seven states. Other possible embodiments include binary counters, which are slower, and one-hot state machines, which use more area.

To emulate a zero-stage shift register, RAM 1204 has several features to pass data through from its input bus 1102 to its output bus 1103. The linear feedback shift registers (LFSRs) in read and write pointers 1205 and 1206 can be initialized to the one state that does not belong to the seven-state graph cycle, and the LFSR remains in that state at every clock cycle; in this state, no word lines are enabled. The precharge circuits have additional circuitry that can steadily short the write bit lines to the read bit lines and never precharge the read bit lines. The clock for the output latches can be configured to hold the latches steadily open.

RAM 1204 can also operate as fourteen words by ten bits. It has separate write word lines for the high and low bytes of each word, and there is a ten-bit-wide two-to-one multiplexer preceding the low byte of the output latches. In addition to the three-bit state of the linear feedback shift register, read pointer 1205 and write pointer 1206 both include an additional state bit to select the high or low byte of RAM 1204.

Read and write pointers 1205 and 1206 are initialized at some rising edge of user clock (UCLK) 805. A synchronization (sync) pulse causes this initialization. The integrated circuit's clock system distributes sync alongside clock throughout each clock tree. The period of sync is a multiple of seven cycles of the internal clock of the inventive network because the read and write pointers cycle back to their initial values every seven (or fourteen) UCLK cycles, and because the clock tree issues sync pulses repeatedly. For more information about the sync pulse, see subsection "Providing Clocks and Synchronization Pulses for the Inventive Network".

Each of the four input ports has a serializer, such as serializer 714a in FIG. 7, that follows the latency padding logic. The serializer splits a twenty-bit input port into four five-bit nybbles and serializes them onto a five-bit internal bundle. The serializer is the only input port layer that uses an internal clock (DCLK) of the inventive cross-connection network for data.

Figure 13:
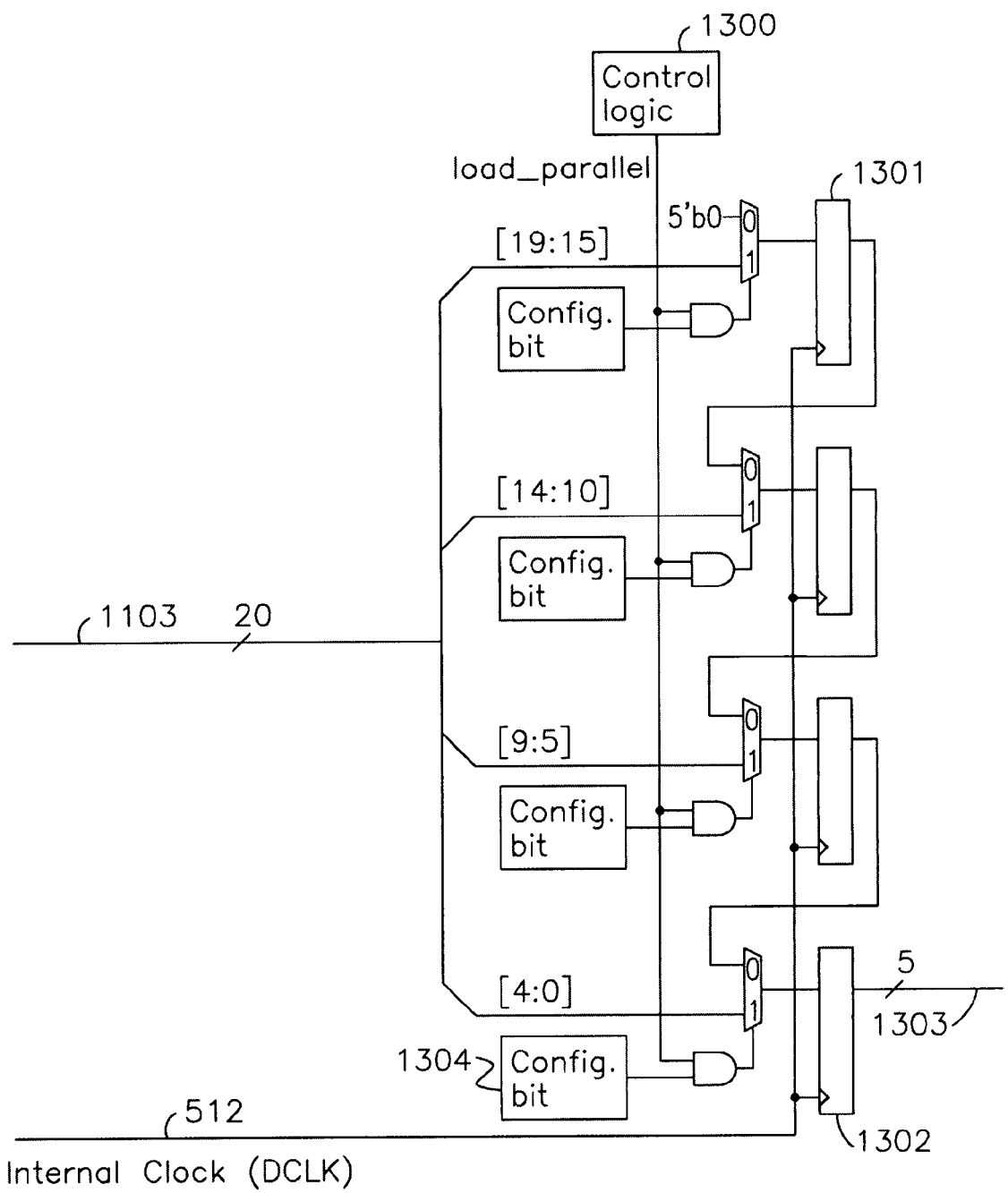
FIG. 13 shows serializing logic for one input port.

FIG. 13 shows the serializer logic for one input port. The twenty-bit input 1103 to the serializer is one of the four buses 723 driven by one of the latency padding units 713a-d (see FIG. 7). The five-bit output 1303 of the serializer goes to the station's network switch.

Each nybble has a two-to-one multiplexer and a register clocked by DCLK 512. The multiplexers and registers are connected to form a four-stage, five-bit-wide shift register that can also load twenty bits in parallel. When control logic 1300 tells the multiplexers to shift, five-bit data 1303 for the network switch emerges from the low-order nybble 1302 of the shift register. An unused nybble is designated by a configuration memory bit, such as configuration bit 1304, that forces the nybble to shift every cycle; this behavior is important for time-slicing, for allowing low-order nybbles to be unused, and for other functions.

The inventive cross-connection network for data (DCC network) can serialize data from more than one input port onto a single five-bit bundle. For example, the library of logic models has a beginpoint model that serializes thirty bits (six nybbles) onto one five-bit bundle. The hardware of the inventive network has three features that work together to implement this function.

The first feature is that the station's network switch has a multi-port OR gate at the root of each routing multiplexer. When a multiplexer is configured to allow more than one bundle into the OR gate, nybbles from all the corresponding input ports can be streamed onto the output of the multiplexer.

The second feature is that in the input port serializer, a shift operation puts 0 into the high-order nybble register 1301, and from there into the rest of the nybble registers. Except during the four cycles of the internal clock (DCLK) that immediately follow a parallel load, the serializer outputs 0 every cycle. At the OR gate in the routing multiplexer, the 0 value from the given port allows data from the other port or ports to pass through the OR gate without corruption.

The third feature is that the serializer control logic 1300 has a configurable divider offset. A divider offset of zero, which is the most common case, causes the serializer to perform a parallel load one DCLK cycle after every rising edge of the user clock. A divider offset greater than zero delays the parallel load by the same number of cycles. For example, in the beginpoint model that serializes thirty bits (six nybbles) onto one five-bit bundle, the low-order port (User Data Input (UDI) bits 19:0) has a divider offset of zero and the high-order port (UDI[29:20]) has a divider offset of four. Therefore, the high-order port always performs a parallel load operation four DCLK cycles after the low-order port does. During the four DCLK cycles when the low-order serializer outputs its data to the network switch, the high-order serializer outputs 0.

The serializer control logic 1300 is initialized at some rising edge of user clock (UCLK). The synchronization (sync) pulse causes this initialization. For more information about the sync pulse, see subsection "Providing Clocks and Synchronization Pulses for the Inventive Network".

Figure 14:
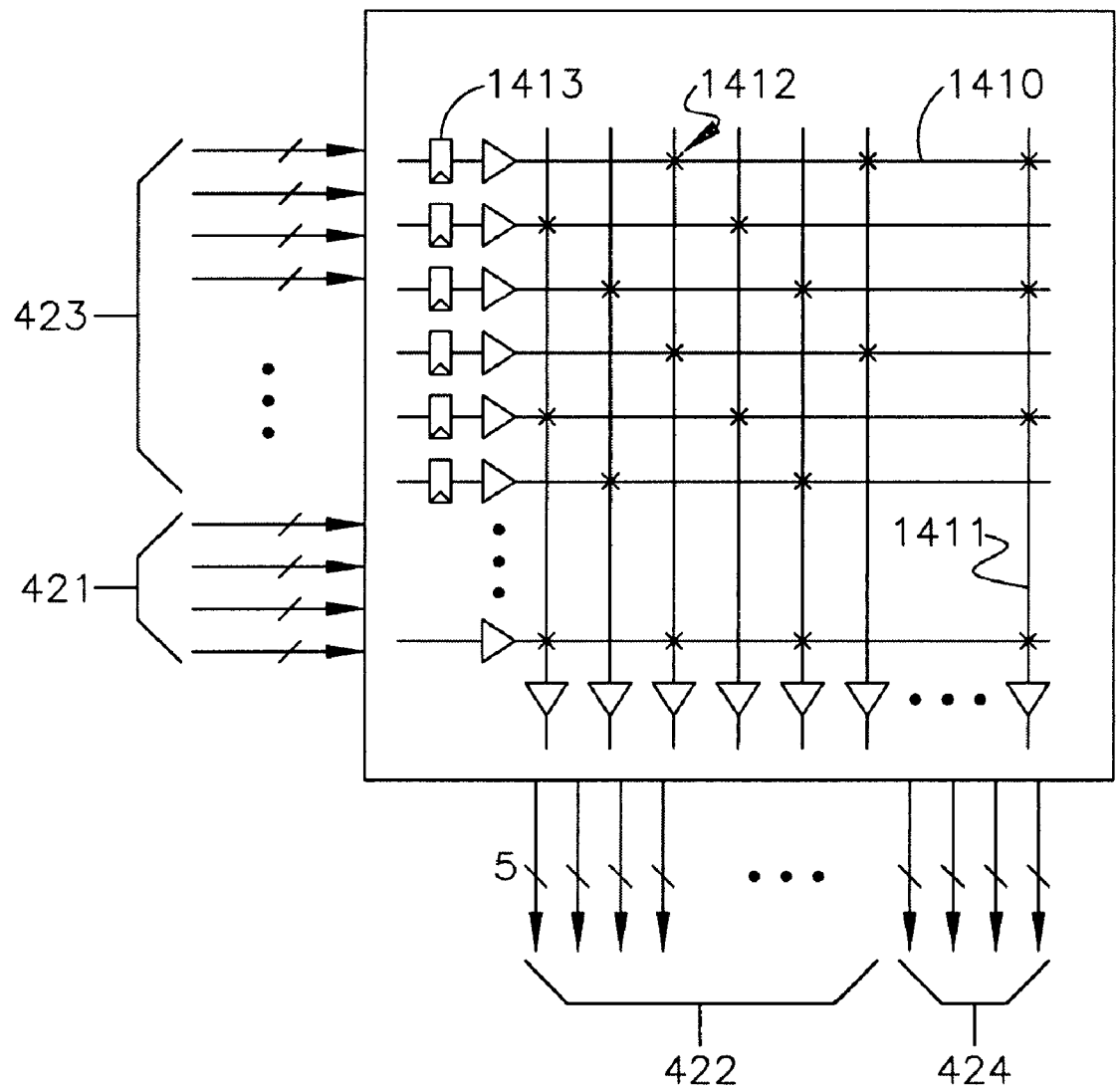
FIG. 14 shows a station's network switch.

Further Details of the Network Switch: FIG. 14 illustrates the network switch in a station. The network switch routes five-bit bundles of data from sixteen input links 423 and four input ports 421 to sixteen output links 422 and four output ports 424. As shown in FIG. 3, the network switch has four input links from each of the adjacent stations in four directions (sets of four input links 320-323 from the North, East, South, and West directions, respectively). The network switch has four output links to each of the adjacent stations in the same four directions (sets of four output links 310-313 to the North, East, South, and West directions, respectively). The network switch has one input bundle from each of ports 0-3, respectively. These input port bundles 421 are the four buses 724 in FIG. 7, which are driven by the four serializers 414. The network switch has one output bundle to each of ports 0-3, respectively. These output port bundles 424 drive the four deserializer units 434 in FIG. 16.

The network switch has twenty five-bit-wide routing multiplexers, each driven by a subset of the twenty input bundles. Thus, it implements a partially populated crossbar switch. The horizontal lines in FIG. 14, such as horizontal line 1410, represent input bundles. The vertical lines, such as vertical line 1411, represent routing multiplexers. The X symbols, such as X symbol 1412, represent populated crosspoints from an input bundle to a routing multiplexer.

The network switch has a pipeline register on every input link from another station. These registers, such as register 1413, are clocked by internal clocks of the inventive network, and they add one cycle of latency for every station that a connection through the inventive network passes through. The pipeline registers make it practical for links in the network to transfer data at very high frequencies (up to two GHz, in the preferred embodiment). The network switch does not have pipeline registers for input ports, output ports, or output links to other stations. Note that input ports have been registered at the serializer, and output ports and output links will be registered at the deserializer or the next station, respectively.

In an alternate embodiment, the pipeline register on every input link could be replaced by latches on every input link and latches clocked by the opposite phase on every output link. If the internal clock frequency of a routed connection through the network is relatively slow, it is possible to reduce the number of pipeline stages in the connection by making some of the latches along the path transparent.

Every routing multiplexer is hardwired to a subset of the twenty input bundles. Compared to twenty-input multiplexers, narrower multiplexers use less die area and cause less circuit delay. The multiplexer for each of the sixteen output links 422 has six inputs, four of which come from input links and two from input ports. The multiplexer for each of the four output ports 424 has ten inputs, eight of which come from input links and two from input ports.

The network switch is not a full crossbar, but the populated inputs of the routing multiplexers were chosen to make it easier for computer-aided design (CAD) software to find Manhattan-distance routes through congested regions of the inventive network. In the preferred embodiment, the inventive network can be thought of as having four routing planes, numbered 0-3. Every input or output bundle belongs to one of the planes. A station's four input ports 0-3 belong to planes 0-3, respectively. Similarly, a station's four output ports 0-3 belong to planes 0-3, respectively. In each plane a station has four output links, one to each of the four directions (North, East, South, and West, respectively). Similarly, in each plane a station has four input links, one from each of the four directions. For an output link that belongs to a given plane, the link's routing multiplexer has more inputs from the same plane than inputs from the other planes.

The routing multiplexer for an output link has inputs from four of the station's sixteen input links. Three of these inputs come from input links in the same routing plane and from different stations than the destination of the given output link. The fourth input comes from an input link in a different plane and from the station on the opposite side of the given station from the given output link, thus providing extra routing flexibility for routes that go straight through the station without turning. For example, the routing multiplexer for the South output link in plane 2 has inputs from the West, North, and East input links in plane 2. It has a fourth input from the North input link in plane 3, which provides extra routing flexibility for routes that go straight through the station from North to South.

The routing multiplexer for an output link has inputs from two of the station's four input ports. One of these inputs comes from the input port in the same routing plane. The other input comes from the input port in the plane numbered 2 greater, modulo 4. For example, the routing multiplexer for the South output link in plane 2 has inputs from the input ports in planes 2 and 0. This feature gives CAD software the ability to launch a connection into a different plane in the network than the plane that the input port belongs to.

The routing multiplexer for an output port has inputs from eight of the station's sixteen input links. Four of these inputs come from input links in an even routing plane, specifically, one from the station in each of the four directions. The other four inputs come from input links in an odd plane, specifically, one from the station in each of the four directions. For example, the routing multiplexer for the output port in plane 1 has inputs from the North, East, South, and West input links in plane 2 and from the North, East, South, and West input links in plane 3.

The routing multiplexer for an output port has inputs from two of the station's four input ports. One of these inputs comes from the input port in the same routing plane. The other input comes from the input port in the plane numbered 2 higher, modulo 4. For example, the routing multiplexer for the output port in plane 1 has inputs from the input ports in planes 1 and 3. The input-port-to-output-port path provides a loopback capability within a station.

The inputs that are available on routing multiplexers make it possible for CAD software to route a connection through the inventive network from an input port in one plane to an output port in any plane, and route all the station-to-station links within a single plane. A connection that starts from an input port in a given plane can be launched into one of two planes inside the network, because every output link's routing multiplexer has inputs from input ports in two planes. The connection can continue on the same plane within the network, because every output link's routing multiplexer has inputs from three input links that allow a route within the same plane to turn left, continue straight, or turn right. The connection can leave the network at an output port in one of two planes, because every output port's routing multiplexer has inputs from input links in two planes. The product of two choices for the station-to-station link plane inside the network and two choices for the output port plane means that a connection can be routed from an input port in a given plane to an output port in any of the four planes. Because such a connection is not required to jump from plane to plane inside the network, CAD software's ability to find a good route is not restricted much by the fact that every output link's routing multiplexer has only one input from an input link in a different plane.

FIG. 15 is a schematic diagram of the six-input routing multiplexer in the preferred embodiment for an output link to an adjacent station. It has four five-bit inputs 1500 from the registered input links from other stations and two five-bit inputs 1501 from the station's input ports. It uses a conventional AND-OR multiplexer design, with the enable signal for each five-bit input bundle coming from a configuration memory bit, such as configuration bit 1502. When one of the configuration bits is set, to 1 and the others are set to 0, the multiplexer simply routes the corresponding input bundle to the output link 1505. It is obvious that alternate embodiments of an AND-OR multiplexer are possible. For example, to reduce circuit delay, the two-input AND gates, such as AND gate 1503, could be replaced by two-input NAND gates, and the six-input OR gate 1504 could be replaced by a six-input NAND gate. To further reduce circuit delay, every two two-input NAND gates and two inputs of the six-input NAND gate could be replaced by a 2-2 AND-OR-INVERT gate; then the six-input NAND gate could be replaced by a three-input NAND gate.

Note that the routing multiplexers in the network switches are configured on a granularity coarser than a single bit. For example, in the preferred embodiment the most commonly used frequency ratio between internal clock and user clock is 4:1. In this situation, a single configuration memory bit steers a twenty-bit user bus. The coarse granularity of the network switch greatly reduces the number of configuration memory bits and multiplexer ports compared to a field-programmable gate array (FPGA) routing network, so it saves a great deal of die area.

When two or more configuration memory bits are set to 1, the routing multiplexer in FIG. 15 ORs together the corresponding input bundles. With appropriate logic upstream to zero out all of the input bundles except one during every cycle, the multiplexer performs cycle-by-cycle selection. In this configuration, the multiplexer can implement a high bandwidth multiplexer (as described under "Uses of the Inventive Network"), time-slice a connection through the inventive network (also described under "Uses of the Inventive Network"), or serialize data from more than one input port onto a single five-bit bundle (as described under "Further Details of the Input Port Logic").

Other embodiments of the multiplexer are possible that use fewer than one configuration memory bit per five-bit input bundle. In one such embodiment, the number of configuration bits equals the base-2 logarithm of the number of input bundles, rounded up to the next integer. In this embodiment, the configuration bits allow no more than one bundle to pass through the multiplexer. Such an embodiment cannot OR together two or more bundles of data and, therefore, cannot perform cycle-by-cycle selection in the network switch.

The ten-input routing multiplexer for an output port in the preferred embodiment is similar to the multiplexer for an output link, but it has inputs from eight input links instead of only four. It has the same ability to perform cycle-by-cycle selection by ORing together two or more input bundles.

Further Details of the Output Port Logic: The output port logic of each station is depicted by elements 431-434 in FIG. 4. More detail is provided by FIG. 16, which is a block diagram of the output port logic. Each group of buses 435 and 1641-1643 consists of four buses. Each of the buses is twenty bits wide and clocked by a user clock. Buses 1644 consist of four buses. Each of the buses, also referred to herein as bundles, is five bits wide and clocked by an internal clock of the inventive network.

Network switch 420 drives the four five-bit bundles 1644. Bundles 1644 drive deserializers 434, which consist of four deserializers 1634*a-d*, one for each port. Deserializers 1634*a-d* drive the four twenty-bit buses 1643. Buses 1643 drive latency padding logic 433, which consists of four latency padding units 1633*a-d*, one for each port. Latency padding units 1633*a-d* drive the four twenty-bit buses 1642. Buses 1642 drive byte shuffling logic 432, which can steer data from one port to another port. Byte shuffling logic 432 drives the four twenty-bit buses 1641. Buses 1641 drive parity generation and checking logic 431, which consists of four parity generation and checking units 1631*a-d*, one for each port. Parity generation and checking units 1631*a-d* drive the four twenty-bit buses 435. Buses 435 drive output multiplexers 1600.

Figure 16:
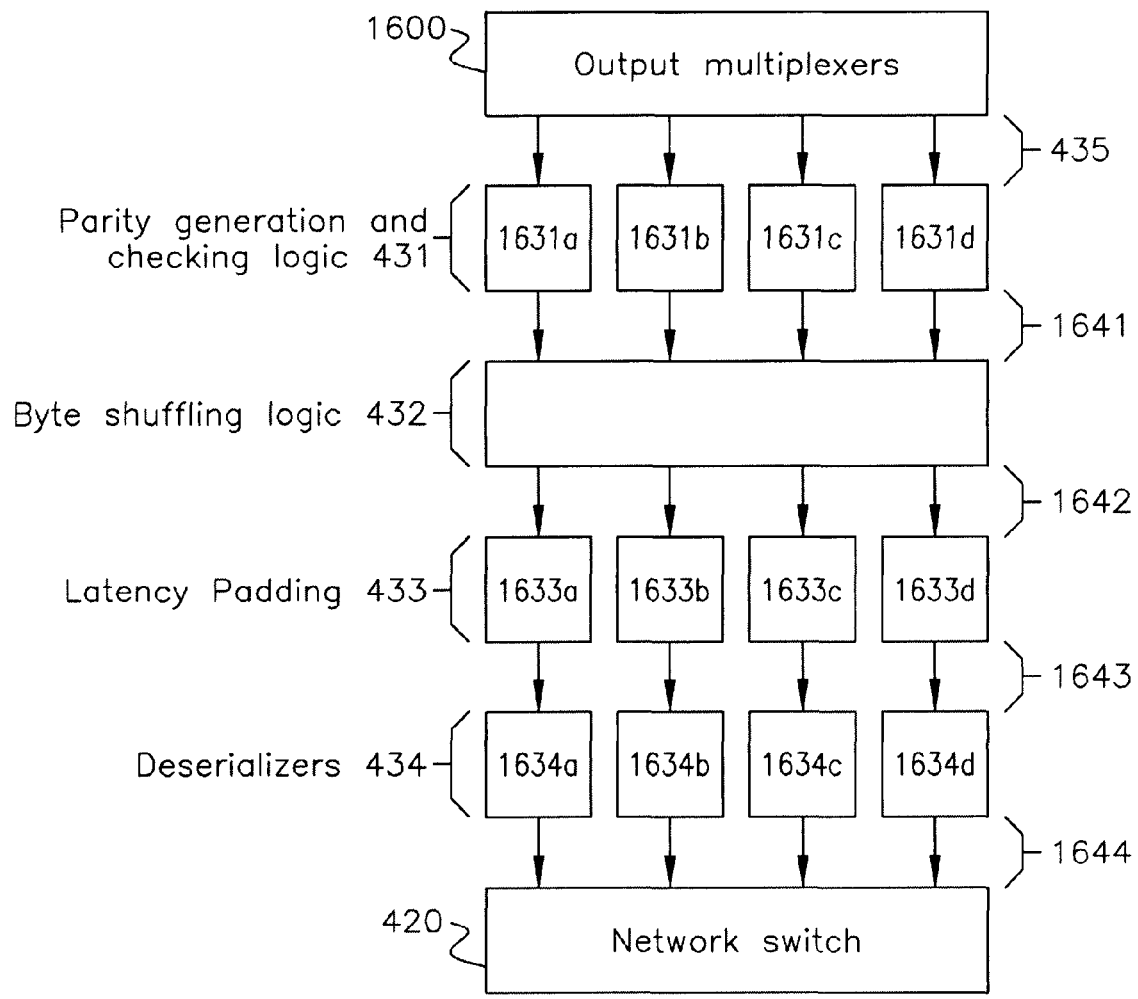
FIG. 16 is a block diagram of output port logic of a station.

Each of the four output ports has a deserializer, such as deserializer 1634*a* in FIG. 16, that receives a five-bit bundle of data from the network switch. The deserializer first shifts the five-bit data through a five-bit-wide shift register clocked by an internal clock (DCLK) of the inventive cross-connection network for data. Then it does a parallel load into a twenty-bit output register. The deserializer is the only output port layer that uses DCLK.

Figure 17:
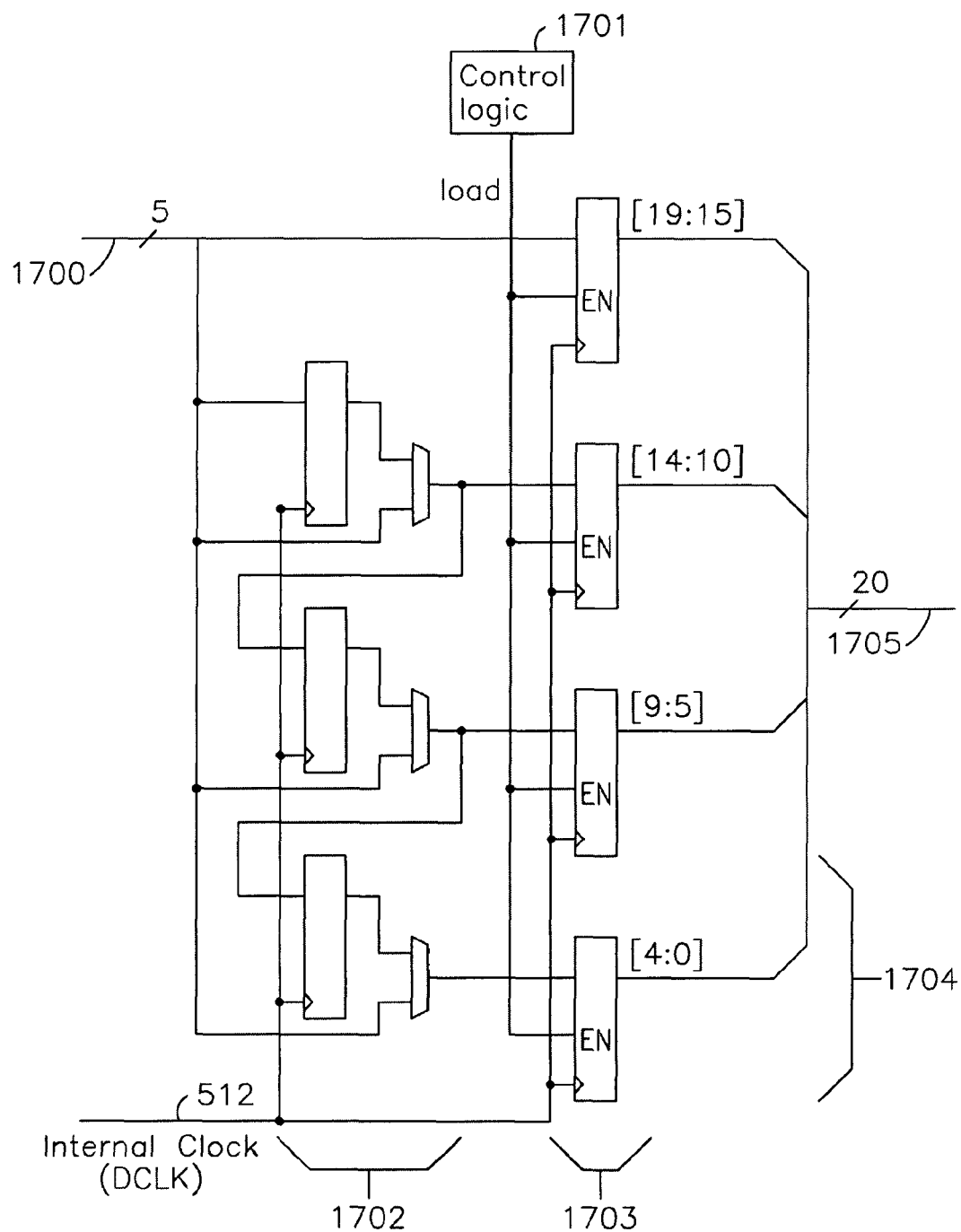
FIG. 17 shows deserializing logic for one output port.

FIG. 17 shows the deserializer logic for one output port. The five-bit input 1700 to the deserializer is one of the four buses 1644 driven by the station's network switch 420 (see FIG. 16). The twenty-bit output 1705 of the deserializer drives the port's latency padding unit. On every rising edge of DCLK 512, a three-stage, five-bit-wide shift register 1702 shifts data from the high-order five-bit nybble toward the low-order nybble 1704 (bits 4:0). Therefore, the first nybble to arrive from the network switch will leave the deserializer in the lowest-order nybble position within the parallel output. The user port width can be set to five, ten, fifteen, or twenty bits by means of configuration memory bits (not shown) that control multiplexers to set the length of shift register 1702 to zero, one, two, or three register stages.

The deserializer control logic has a configurable divider offset. An offset of zero causes the twenty-bit output register to perform a parallel load one internal clock (DCLK) cycle before every rising edge of user clock (UCLK), and an offset greater than zero makes the parallel load occur that many DCLK cycles earlier. The routing latency through a sequence of network switches can take an arbitrary number of DCLK cycles, so the divider offset allows the deserialized word to be captured at any DCLK cycle modulo the UCLK divider ratio.

The inventive cross-connection network for data (DCC network) can deserialize data from a single five-bit bundle onto more than one output port. For example, the library of logic models has an endpoint model that deserializes one five-bit bundle onto thirty bits (six nybbles). The hardware of the inventive network has two features that work together to implement this function.

The first feature is that a bundle can be routed within the network to fan out to two or more output ports. All the ports receive the same nybble into their shift registers at the same internal clock (DCLK) cycle.

The second feature is that each output port can be configured with a different divider offset, so at any given cycle at most one port does a parallel load into its output register. For example, in the endpoint model that deserializes one five-bit bundle onto thirty bits, the low-order port (User Data Output (UDO) bits 19:0) has a divider offset of two and the high-order port (UDO[29:20]) has a divider offset of zero. Therefore, the low-order output register always performs a parallel load of its four nybbles two DCLK cycles before the high-order output register does a parallel load of its two nybbles.

The deserializer control logic 1701 is initialized at some rising edge of the user clock. The synchronization (sync) pulse causes this initialization. For more information about the sync pulse, see subsection "Providing Clocks and Synchronization Pulses for the Inventive Network".

Each output port has latency padding logic, such as latency padding unit 1633*a* in FIG. 16. Computer-aided design (CAD) software can use this logic to pad the end-to-end latency through the inventive network to equal the value specified by the user.

Figure 18:
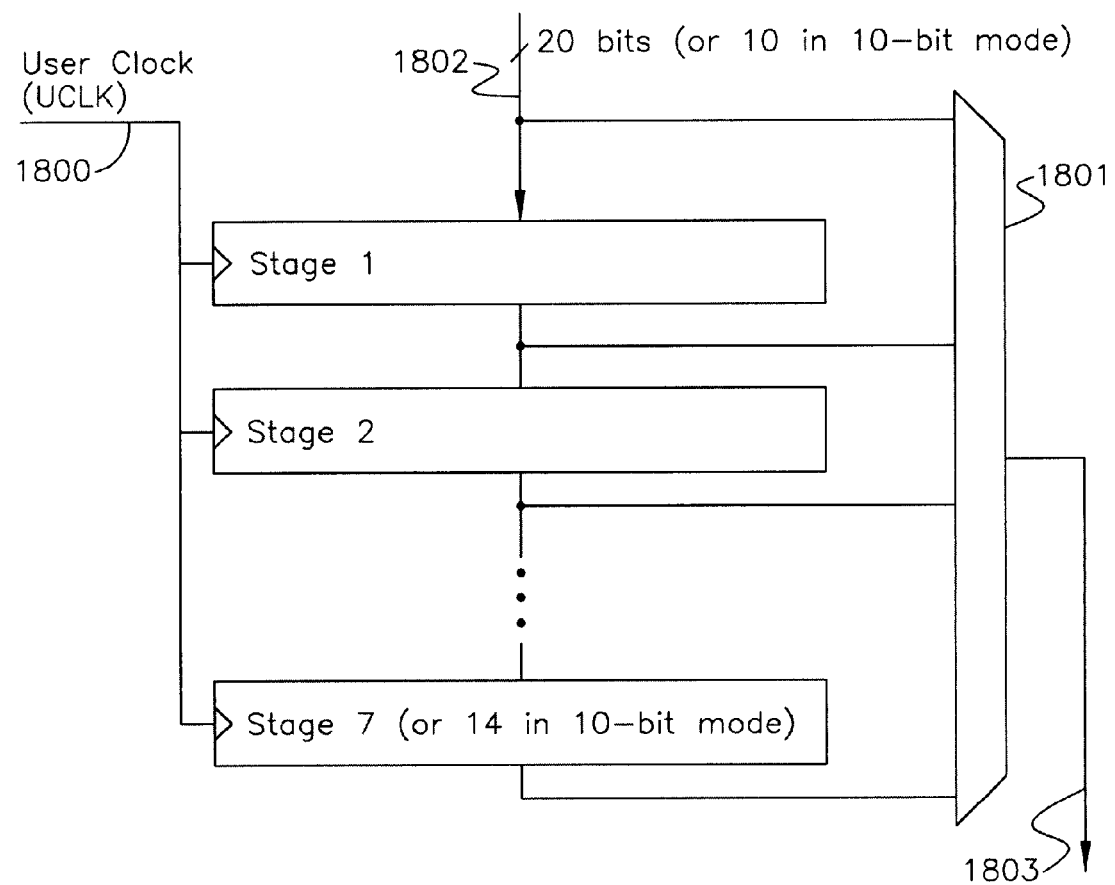
FIG. 18 is a schematic diagram of the effective behavior of the latency padding logic for one output port.

FIG. 18 is a schematic diagram of the effective behavior of the latency padding logic for one output port, such as latency padding unit 1633*a*. It behaves as a shift register that is clocked by user clock 1800. The effective shift register depth is determined by the configuration memory bits that control multiplexer 1801. The twenty-bit input 1802 to the latency padding unit is one of the four buses 1643 driven by one of the four deserializer units 1634*a*-1634*d* (see FIG. 16). The twenty-bit output 1803 drives the station's byte shuffling logic.

The logic can be configured to behave like a twenty-bit-wide shift register with zero to seven stages or like a ten-bit-wide shift register with zero to fourteen stages. When the logic is configured as a zero-stage shift register, it passes data through from input bus 1802 to output bus 1803 without any register delays. The deeper-and-narrower fourteen-by-ten configuration is useful when only ten bits or five bits of the port are meaningful, which is the case when the frequency ratio between the internal clock of the inventive network and the user clock is 2:1 or 1:1.

The hardware implementation of the latency padding logic for an output port is identical to the implementation for an input port. For more information about an input port's implementation, see the description under subsection "Further Details of the Input Port Logic."

The byte shuffling logic layer of the output logic allows the four ports to exchange data with each other. Its main function is to support a 2:1 frequency ratio between an internal clock of the inventive network and a user clock. For all other frequency ratios, CAD software configures this logic to pass the twenty bits of each port straight through on the same port.

Figure 19:
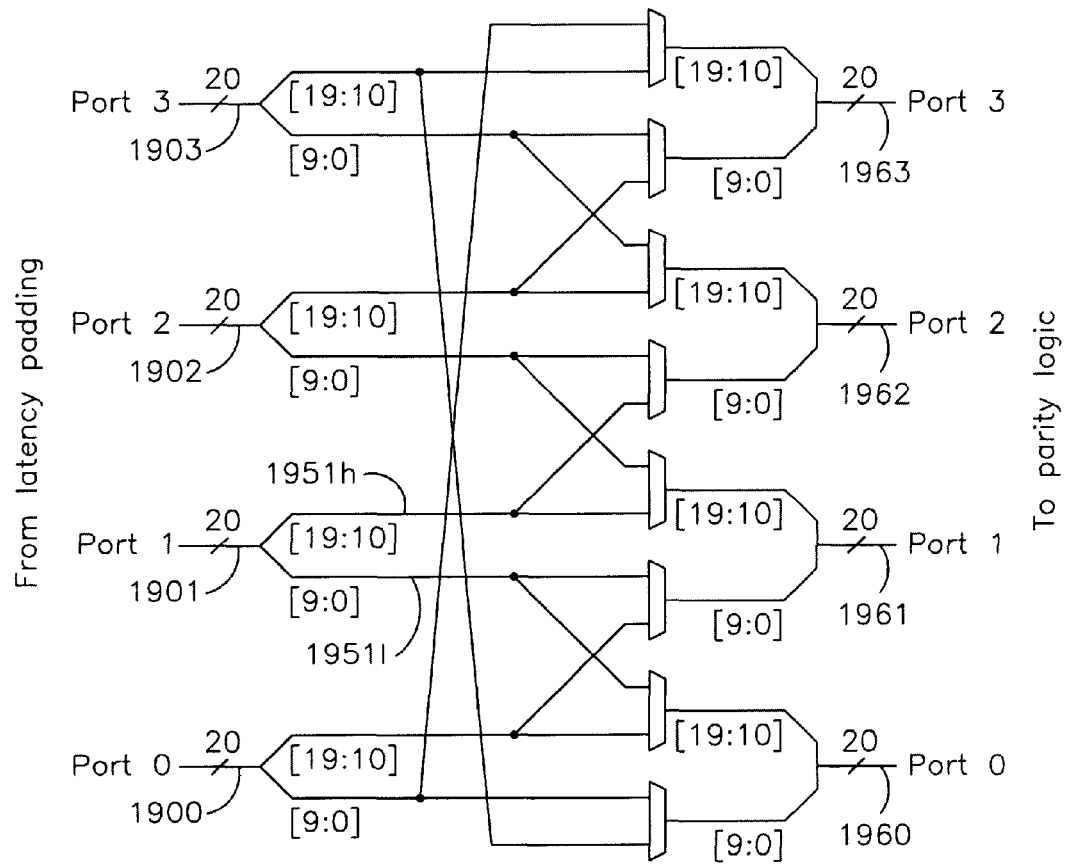
FIG. 19 shows byte shuffling logic for output ports of a station.

The byte shuffling logic for an output port is identical to that for an input port. FIG. 19 shows the byte shuffling logic for all four output ports; the multiplexers in the figure are controlled by configuration memory. The byte shuffling unit has one twenty-bit input bus 1900-1903 for each of ports 0-3, respectively. These input buses are the four buses 1642 in FIG. 16, which are driven by the four latency padding units 1633*a*-1633*d*. The byte shuffling unit has one twenty-bit output bus 1960-1963 for each of ports 0-3, respectively. These output buses drive the four parity units 1631*a*-1631*d* (see FIG. 16).

The byte shuffling logic treats each port as two ten-bit bytes. For example, port 1's input bus 1901 consists of low-order byte 1951*l* and high-order byte 1951*h*. Configurable multiplexers either keep the low-order byte of port i on port i, or steer it to the high-order byte position of port i−1 (mod 4). For example, multiplexers either direct port 1's low-order input byte 1951*l* to port 1's output bus 1961, or steer it to the high-order byte of port 0's output bus 1960. Similarly, the multiplexers either keep the high-order byte of port i on port i, or steer it to the low-order byte position of port i+1 (mod 4). For example, multiplexers either direct port 1's high-order input byte 1951*h* to port 1's output bus 1961, or steer it to the low-order byte of port 2's output bus 1962.

The 2:1 frequency ratio works with byte shuffling as follows. Each five-bit internal bundle, clocked at the internal clock (DCLK) frequency, is associated with a twenty-bit output port, clocked at the slower user clock (UCLK) frequency. When the ratio of DCLK to UCLK is 2:1, a five-bit bundle can be deserialized onto only ten bits of the twenty-bit port. If all twenty bits of the port are in use, the port's data comes from two five-bit internal bundles. The byte shuffling multiplexers steer two ten-bit buses, which originally came from two adjacent deserializers, onto a single twenty-bit output port.

Figure 20:
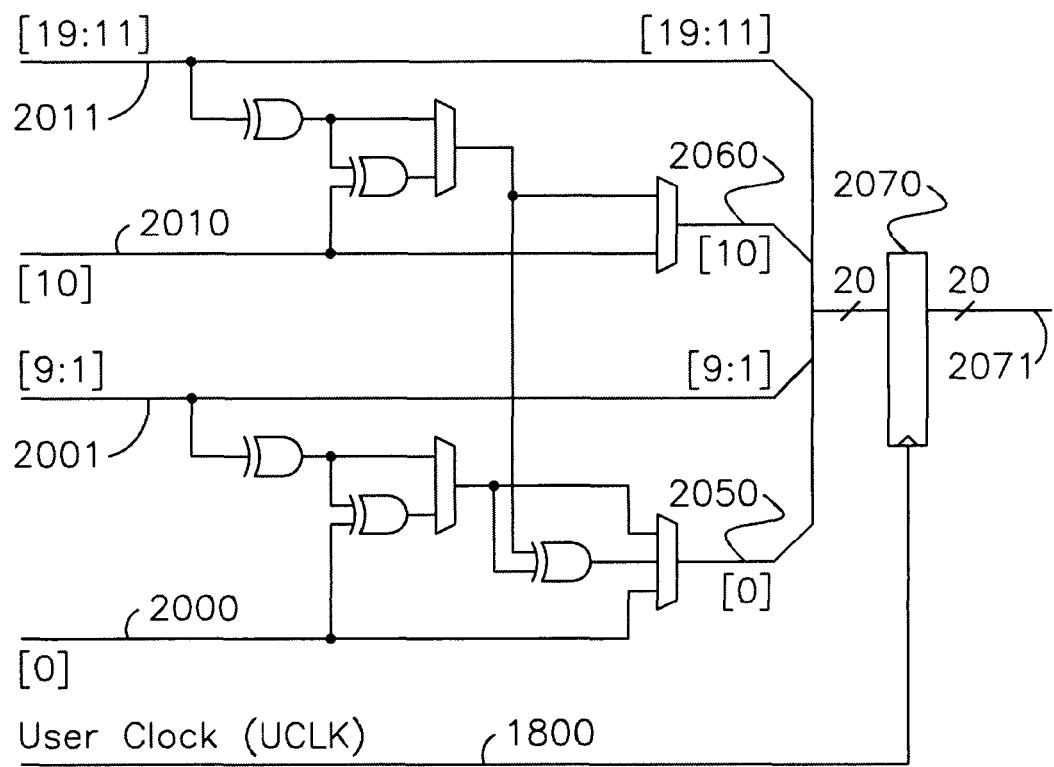
FIG. 20 shows parity generation and checking logic for one output port.

FIG. 20 is a schematic diagram of the parity generation and checking logic for one output port, such as parity unit 1631*a*. The parity logic can be configured for bypass (leaving all twenty bits unchanged), parity generation, or parity checking. It can be configured to operate on all twenty bits as a group or on the two ten-bit bytes as independent groups. The output of the parity logic is staged by twenty-bit register 2070 that is clocked by the output port's user clock (UCLK) 1800. Except for having an output register, the parity logic for an output port is identical to that for an input port. The twenty-bit input to the parity unit is one of the four buses 1641 driven by the byte shuffling logic 432 (see FIG. 16). The low-order input byte consists of bit 0 2000 and bits 9:1 2001, and the high-order input byte consists of bit 10 2010 and bits 19:112011. The twenty-bit output of the XOR logic (bit 0 2050, bits 9:1 2001, bit 10 2060, and bits 19:11 2011) drives register 2070. The output 2071 of register 2070 drives some of the station's output multiplexers.

To generate parity, the logic computes the exclusive-OR (XOR) of the high nineteen bits or nine bits of the parity group and injects the computed parity on the low-order bit of the group (bit 0 2050 in twenty-bit mode or bit 10 2060 and bit 0 2050 in ten-bit mode). To check parity, the logic computes the XOR of all twenty bits or ten bits of the parity group and injects the error result on the low-order bit; the result is 1 if and only if a parity error has occurred.

The multiplexers in FIG. 20 are controlled by configuration memory. The multiplexers determine whether the parity logic operates in bypass, generate, or check mode. The multiplexers also determine whether the parity logic operates in twenty-bit mode or ten-bit mode.

Providing Clocks and Synchronization Pulses for the Inventive Network: The inventive network works with the clock distribution system of the integrated circuit. A synchronization (sync) pulse initializes counters in the clock network and in the stations of the inventive network.

A connection through the inventive network is completely synchronous, but it typically uses at least two clock frequencies. The user clocks have an integer frequency ratio to the internal clock of the network. This ratio is typically 2:1 or greater, but it may be 1:1. Furthermore, the user clock for different beginpoints or endpoints belonging to a connection through the network may have different frequencies. For example, FIG. 5 illustrates a connection through the inventive network with three clock frequencies. Internal clock 512 operates at one thousand, six hundred MHz. User clock 513 operates at four hundred MHz, which has a 4:1 ratio to the internal clock. User clock 514 operates at two hundred MHz, which has an 8:1 ratio to the internal clock.

These clock signals operate at different frequencies, but they have aligned edges and low skew between them to allow synchronous interfacing between the user clock domain or domains and the internal clock domain of the inventive network. The field-programmable gate array (FPGA) containing the inventive network has a clock distribution system that can produce lower-frequency clocks by dividing down a root clock by configurable integer ratios. The clock distribution system also guarantees that the root clock and the divided clocks have aligned edges and low skew among them.

In the preferred embodiment, there are clock dividers at the third level of the clock distribution network, and the dividers can be configured to create any integer clock ratio from 1:1 to 16:1 relative to the root clock. In other embodiments, the dividers may be at a different level of the clock network and they may support different divider ratios.

The internal clock of the inventive network and the user clock or clocks for a given connection through the network all derive from the same root clock, but different connections can use different root clocks. For example, a user can choose a one thousand, six hundred MHz root clock for some connections in their design and a one thousand, two hundred fifty MHz root clock for others.

The clock distribution system and the inventive network have many counters that are initialized simultaneously. When multiple dividers in a clock tree have the same clock divider ratio, their dividers are initialized at the same rising edge of the root clock in order to cause the divided output clocks to be in phase with each other. The control logic for an input port serializer is initialized at some rising edge of the user clock; so is the control logic for an output port deserializer. In the preferred implementation, latency padding logic in input and output ports is implemented by a random-access memory (RAM); the RAM's read and write pointers are initialized at some rising edge of the user clock.

To perform all of these initializations, the FPGA containing the inventive network generates a synchronization (sync) pulse and distributes it to all the clock dividers and all the stations that use those dividers. It is convenient to generate the sync pulse at the root of the clock network and distribute it alongside clock down through the levels of the network. A single synchronization pulse that occurs at the start of functional operation is enough to initialize the clock system and the stations. The counters in the clock system and the stations will remain synchronized thereafter because they are configured to cycle through a sequence of states with a fixed period.

To help in ensuring that a reset pulse issued from one clock domain can be seen by clock edges in all the related domains that have different divider ratios, it is useful to issue the synchronization (sync) pulse repeatedly rather than just once. Therefore, the preferred embodiment issues periodic sync pulses. The sync pulses occur at times when the counters in the clock system and the stations would have reinitialized themselves anyway. The period of the sync pulse is configurable, and CAD software sets it to a suitable value, as measured in root clock cycles. The period is the least common multiple (LCM), or a multiple thereof, of the divider ratios of all the clock dividers that participate in connections through the inventive networks. In the preferred embodiment, the period is also a multiple of seven, because the read and write pointers in latency padding logic cycle back to their initial values every seven (or fourteen) user clock cycles.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A programmable integrated circuit having a bus structure for a cross-connection network for data (DCC network), comprising:
    a plurality of stations having an input station, one or more intermediate stations, and a destination station, each station comprising a pipeline register, the input station serializing data at a first frequency X, the one or more intermediate stations registering the serialized data at a second frequency Y, the destination station deserializing the data at a third frequency Z, the first frequency and the second frequency forming a first frequency ratio Y/X, the second frequency and the third frequency forming a second frequency ratio Y/Z, the input station including a first multiplexer coupled between a first serializer and a first pipeline register, a first multiplexer having a plurality of inputs, an output, at least one select signal, the at least one select signal for selecting between the first serializer, other serializers, and other pipeline registers to a first pipeline register; and
    connectors selectively joining each pipeline register at the corresponding station based on a select signal for selecting between special-purpose circuits, other pipeline registers, and logic circuits.

2. The programmable integrated circuit of claim 1, wherein the first frequency ratio of Y/X is an integer ratio.

3. The programmable integrated circuit of claim 1, wherein the second frequency ratio of Y/Z is an integer ratio.

4. The programmable integrated circuit of claim 1, wherein the plurality of stations comprise an array of stations, each station configurable to an input station, an intermediate station, or a destination station.

5. A programmable integrated circuit, comprising:
    a first station having a first serializer and a first pipeline register, the first serializer coupled to the first pipeline register, the first serializer having an input port for receiving input data at a first frequency and serializing the input data at a second frequency to generate serialized data at an output port;
    a second station having a second pipeline register and a deserializer, the first pipeline register coupled to the second pipeline register, the second pipeline register coupled to the deserialzer, the deserializer receiving the serialized data through the second pipeline register at the second frequency and deserializing the serialized data at a third frequency to generate an output data at an output port of the deserializer, the output port of the deserialzer being coupled to a second special-purpose circuit or a second logic circuit; and
    a first multiplexer and a second multiplexer, the first multiplexer having a first input, a second input, an output, and at least one select signal, the second multiplexer having a first input, a second input, an output, and at least one select signal, the first input of the first multiplexer and the first input of the second multiplexer being commonly coupled to the output port of the deserialzer, the second input of the first multiplexer coupled to an output of the second logic circuit, the second input of the second multiplexer coupled to an output of the second special-purpose circuit, the output of the first multiplexer coupled to an input of the second special-purpose circuit, the output of the second multiplexer coupled to an input of the second logic circuit, the at least one signal of the first multiplexer for selecting between the first and the second input of the first multiplexer, the at least one signal of the second multiplexer for selecting between the first input and the second input of the second multiplexer.

6. The programmable integrated circuit of claim 5, wherein the first station comprises an input station, and the second station comprises a destination station.

7. The programmable integrated circuit of claim 5, further comprising one or more intermediate stations coupled between the first station and the second station.

8. The programmable integrated circuit of claim 7, wherein each intermediate station comprises a respective multiplexer coupled to a respective register, the respective multiplexer having a plurality of input ports, an output port, and at least one select signal, the at least one select signal for selecting between the input ports to the respective pipeline register.

9. The programmable integrated circuit of claim 5, wherein the first station is the same as the second station.

10. The programmable integrated circuit of claim 5, further comprising a first multiplexer having a first input, a second input, an output, and at least one select signal, the first input coupled to a first special-purpose circuit, the second input coupled to a first logic circuit, and the output coupled to the serializer, the at least one select signal for selecting between connecting the first special-purpose circuit or the first logic circuit to the serializer.

11. The programmable integrated circuit of claim 5, wherein the first station comprises a first multiplexer coupled between the first serializer and the first pipeline register, the first multiplexer having a plurality of inputs, an output, at least one select signal, the at least one select signal for selecting between the first serializer, other serializers, and other pipeline registers to the first pipeline register.

12. The programmable integrated circuit of claim 5, wherein the second station comprises a first multiplexer coupled between the first pipeline register and the second pipeline register, the first multiplexer having a plurality of inputs, an output, at least one select signal, the at least one select signal for selecting between the first pipeline register and other pipeline registers to the second pipeline register.

13. The programmable integrated circuit of claim 5, wherein the second station comprises a first multiplexer coupled between the second pipeline register and the deserialzer, the first multiplexer having a plurality of inputs, an output, at least one select signal, the at least one select signal for selecting between the second pipeline register, other pipeline registers, and other serializers to the deserialzer.

14. The programmable integrated circuit of claim 5, wherein the first station comprises an input converting circuit having an input port for receiving the input data, and an output coupled to an input port of the first serializer.

15. The programmable integrated circuit of claim 14, wherein the input converting circuitry comprises data zeroing circuitry.

16. The programmable integrated circuit of claim 14, wherein the input converting circuitry comprises parity checking and generation circuitry.

17. The programmable integrated circuit of claim 14, wherein the input converting circuitry comprises byte shuffling circuitry.

18. The programmable integrated circuit of claim 14, wherein the input converting circuitry comprises latency padding circuitry.

19. The programmable integrated circuit of claim 5, wherein the second station comprises an output converting circuit having an output port for generating output data, and an input port coupled to the deserialzer.

20. The programmable integrated circuit of claim 19, wherein the output converting circuitry comprises parity checking and generation circuitry.

21. The programmable integrated circuit of claim 19, wherein the output converting circuitry comprises byte shuffling circuitry.

22. The programmable integrated circuit of claim 19, wherein the output converting circuitry comprises latency padding circuitry.

23. A method for data communication having a first station coupled a second station, the first station having a first serializer coupled to a first pipeline register, the second station having a second pipeline register coupled to a deserialzer, comprising:
   serializing input data at a first frequency, by the first serializer, to serialized data at a second frequency;
   first registering the serialized data received from the serializer at the first pipeline register;
   selectively coupling the first pipeline register and other pipeline registers to the second pipeline register;
   second registering the serialized data received from the first pipeline register at the second pipeline register; and
   deserializing the serialized data at the second frequency from the second pipeline register to output data at a third frequency.

24. The method of claim 23, between the first registering and the second registering, further comprising one or more registering the serialized data at one or more pipeline registers.

25. The method of claim 23, between the first registering and the second registering, further comprising one or more selectively registerings of the serialized data received from the first station, or other serialized data received from other stations.

26. The method of claim 23, prior to the serializing step, further comprising selecting from a first special-purpose circuit or a first logic circuit to an input of the serializer.

27. The method of claim 23, after the deserializing step, further comprising coupling to a second special-purpose circuit or a second logic circuit.

28. The method of claim 23, after the deserializing step, selectively coupling an output of the second logic circuit and an output of the deserializer to an input of the second special-purpose circuit, and selectively coupling an output of the second special-purpose circuit and the output of the deserializer to an input of the second logic circuit.

29. The method of claim 23, between the serializing step and the first registering step, further comprising selectively coupling the first serializer, other serializers, and other pipeline registers to the first pipeline register.

30. The method of claim 23, between the second registering and the deserializing step, further comprising selectively coupling the second pipeline register, other pipeline registers, and other serializers to the deserialzer.

31. The method of claim 23, prior to the serializing step, further comprising converting the input data.

32. The method of claim 31, wherein the converting step comprises data zeroing.

33. The method of claim 31, wherein the converting step comprises parity generation and checking.

34. The method of claim 31, wherein the converting step comprises byte shuffling.

35. The method of claim 31, wherein the converting step comprises latency padding.

36. The method of claim 23, after the deserializing step, further comprising converting the output data.

37. The method of claim 36, wherein the converting step comprises parity generating and checking.

38. The method of claim 36, wherein the converting step comprises byte shuffling.

39. The method of claim 36, wherein the converting step comprises latency padding.

40. A programmable integrated circuit, comprising:
   a first station having a first serializer and a first pipeline register, the first serializer coupled to the first pipeline register, the first serializer having an input port for receiving input data at a first frequency and serializing the input data at a second frequency to generate serialized data at an output port, the first station including a first multiplexer coupled between the first serializer and the first pipeline register, the first multiplexer in the first station having a plurality of inputs, an output, at least one select signal, the at least one select signal for selecting between the first serializer, other serializers, and other pipeline registers to the first pipeline register; and
   a second station having a second pipeline register and a deserializer, the first pipeline register coupled to the second pipeline register, the second pipeline register coupled to the deserialzer, the deserializer receiving the serialized data through the second pipeline register at the second frequency and deserializing the serialized data at a third frequency to generate an output data at an output port of the deserializer.

41. The programmable integrated circuit of claim 40, wherein the first station comprises an input station, and the second station comprises a destination station.

42. The programmable integrated circuit of claim 40, further comprising one or more intermediate stations coupled between the first station and the second station.

43. The programmable integrated circuit of claim 42, wherein each intermediate station comprises a respective multiplexer coupled to a respective register, the respective multiplexer having a plurality of input ports, an output port, and at least one select signal, the at least one select signal for selecting between the input ports to the respective pipeline register.

44. The programmable integrated circuit of claim 40, wherein the first station is the same as the second station.

45. The programmable integrated circuit of claim 40, further comprising a first multiplexer having a first input, a second input, an output, and at least one select signal, the first input coupled to a first special-purpose circuit, the second input coupled to a first logic circuit, and the output coupled to the serializer, the at least one select signal for selecting between connecting the first special-purpose circuit or the first logic circuit to the serializer.

46. The programmable integrated circuit of claim 40, wherein the output port of the deserialzer is coupled to a second special-purpose circuit or a second logic circuit.

47. The programmable integrated circuit of claim 46, further comprising a first multiplexer and a second multiplexer, the first multiplexer having a first input, a second input, an output, and at least one select signal, the second multiplexer having a first input, a second input, an output, and at least one select signal, the first input of the first multiplexer and the first input of the second multiplexer being commonly coupled to the output port of the deserialzer, the second input of the first multiplexer coupled to an output of the second logic circuit, the second input of the second multiplexer coupled to an output of the second special-purpose circuit, the output of the first multiplexer coupled to an input of the second special-purpose circuit, the output of the second multiplexer coupled to an input of the second logic circuit, the at least one signal of the first multiplexer for selecting between the first and the second input of the first multiplexer, the at least one signal of the second multiplexer for selecting between the first input and the second input of the second multiplexer.

48. The programmable integrated circuit of claim 40, wherein the second station comprises a first multiplexer coupled between the first pipeline register and the second pipeline register, the first multiplexer having a plurality of inputs, an output, at least one select signal, the at least one select signal for selecting between the first pipeline register and other pipeline registers to the second pipeline register.

49. The programmable integrated circuit of claim 40, wherein the second station comprises a first multiplexer coupled between the second pipeline register and the deserialzer, the first multiplexer having a plurality of inputs, an output, at least one select signal, the at least one select signal for selecting between the second pipeline register, other pipeline registers, and other serializers to the deserialzer.

50. The programmable integrated circuit of claim 40, wherein the first station comprises an input converting circuit having an input port for receiving the input data, and an output coupled to an input port of the first serializer.

51. The programmable integrated circuit of claim 50, wherein the input converting circuitry comprises data zeroing circuitry.

52. The programmable integrated circuit of claim 50, wherein the input converting circuitry comprises parity checking and generation circuitry.

53. The programmable integrated circuit of claim 50, wherein the input converting circuitry comprises byte shuffling circuitry.

54. The programmable integrated circuit of claim 50, wherein the input converting circuitry comprises latency padding circuitry.

55. The programmable integrated circuit of claim 40, wherein the second station comprises an output converting circuit having an output port for generating output data, and an input port coupled to the deserialzer.

56. The programmable integrated circuit of claim 55, wherein the output converting circuitry comprises parity checking and generation circuitry.

57. The programmable integrated circuit of claim 55, wherein the output converting circuitry comprises byte shuffling circuitry.

58. The programmable integrated circuit of claim 55, wherein the output converting circuitry comprises latency padding circuitry.

59. A programmable integrated circuit, comprising:
    a first station having a first serializer and a first pipeline register, the first serializer coupled to the first pipeline register, the first serializer having an input port for receiving input data at a first frequency and serializing the input data at a second frequency to generate serialized data at an output port; and
    a second station having a second pipeline register and a deserializer, the first pipeline register coupled to the second pipeline register, the second pipeline register coupled to the deserialzer, the deserializer receiving the serialized data through the second pipeline register at the second frequency and deserializing the serialized data at a third frequency to generate an output data at an output port of the deserializer, the second station including a first multiplexer coupled between the second pipeline register and the deserialzer, the first multiplexer in the second station having a plurality of inputs, an output, at least one select signal, the at least one select signal for selecting between the second pipeline register, other pipeline registers, and other serializers to the deserialzer.

60. The programmable integrated circuit of claim 59, wherein the first station comprises an input station, and the second station comprises a destination station.

61. The programmable integrated circuit of claim 59, further comprising one or more intermediate stations coupled between the first station and the second station.

62. The programmable integrated circuit of claim 61, wherein each intermediate station comprises a respective multiplexer coupled to a respective register, the respective multiplexer having a plurality of input ports, an output port, and at least one select signal, the at least one select signal for selecting between the input ports to the respective pipeline register.

63. The programmable integrated circuit of claim 59, wherein the first station is the same as the second station.

64. The programmable integrated circuit of claim 59, further comprising a first multiplexer having a first input, a second input, an output, and at least one select signal, the first input coupled to a first special-purpose circuit, the second input coupled to a first logic circuit, and the output coupled to the serializer, the at least one select signal for selecting between connecting the first special-purpose circuit or the first logic circuit to the serializer.

65. The programmable integrated circuit of claim 59, wherein the output port of the deserialzer is coupled to a second special-purpose circuit or a second logic circuit.

66. The programmable integrated circuit of claim 59, further comprising a first multiplexer and a second multiplexer, the first multiplexer having a first input, a second input, an output, and at least one select signal, the second multiplexer having a first input, a second input, an output, and at least one select signal, the first input of the first multiplexer and the first input of the second multiplexer being commonly coupled to the output port of the deserialzer, the second input of the first multiplexer coupled to an output of the second logic circuit, the second input of the second multiplexer coupled to an output of the second special-purpose circuit, the output of the first multiplexer coupled to an input of the second special-purpose circuit, the output of the second multiplexer coupled to an input of the second logic circuit, the at least one signal of the first multiplexer for selecting between the first and the second input of the first multiplexer, the at least one signal of the second multiplexer for selecting between the first input and the second input of the second multiplexer.

67. The programmable integrated circuit of claim 59, wherein the first station comprises a first multiplexer coupled between the first serializer and the first pipeline register, the first multiplexer having a plurality of inputs, an output, at least one select signal, the at least one select signal for selecting between the first serializer, other serializers, and other pipeline registers to the first pipeline register.

68. The programmable integrated circuit of claim 59, wherein the second station comprises a first multiplexer coupled between the first pipeline register and the second pipeline register, the first multiplexer having a plurality of inputs, an output, at least one select signal, the at least one select signal for selecting between the first pipeline register and other pipeline registers to the second pipeline register.

69. The programmable integrated circuit of claim 59, wherein the first station comprises an input converting circuit having an input port for receiving the input data, and an output coupled to an input port of the first serializer.

70. The programmable integrated circuit of claim 59, wherein the input converting circuitry comprises data zeroing circuitry.

71. The programmable integrated circuit of claim 70, wherein the input converting circuitry comprises parity checking and generation circuitry.

72. The programmable integrated circuit of claim 70, wherein the input converting circuitry comprises byte shuffling circuitry.

73. The programmable integrated circuit of claim 70, wherein the input converting circuitry comprises latency padding circuitry.

74. The programmable integrated circuit of claim 59, wherein the second station comprises an output converting circuit having an output port for generating output data, and an input port coupled to the deserialzer.

75. The programmable integrated circuit of claim 59, wherein the output converting circuitry comprises parity checking and generation circuitry.

76. The programmable integrated circuit of claim 59, wherein the output converting circuitry comprises byte shuffling circuitry.

77. The programmable integrated circuit of claim 59, wherein the output converting circuitry comprises latency padding circuitry.

78. A method for data communication having a first station coupled a second station, the first station having a first serializer coupled to a first pipeline register, the second station having a second pipeline register coupled to a deserialzer, comprising:
  serializing input data at a first frequency, by the first serializer, to serialized data at a second frequency;
  first registering the serialized data received from the serializer at the first pipeline register;
  second registering the serialized data received from the first pipeline register at the second pipeline register;
  selectively coupling the second pipeline register, other pipeline registers, and other serializers to the deserialzer; and
  deserializing the serialized data at the second frequency from the second pipeline register to output data at a third frequency.

79. The method of claim 78, between the first registering and the second registering, further comprising one or more registering the serialized data at one or more pipeline registers.

80. The method of claim 78, between the first registering and the second registering, further comprising one or more selectively registerings of the serialized data received from the first station, or other serialized data received from other stations.

81. The method of claim 78, prior to the serializing step, further comprising selecting from a first special-purpose circuit or a first logic circuit to an input of the serializer.

82. The method of claim 78, after the deserializing step, further comprising coupling to a second special-purpose circuit or a second logic circuit.

83. The method of claim 78, after the deserializing step, selectively coupling an output of the second logic circuit and an output of the deserializer to an input of the second special-purpose circuit, and selectively coupling an output of the second special-purpose circuit and the output of the deserializer to an input of the second logic circuit.

84. The method of claim 78, between the serializing step and the first registering step, further comprising selectively coupling the first serializer, other serializers, and other pipeline registers to the first pipeline register.

85. The method of claim 78, between the first registering and the second registering, further comprising selectively coupling the first pipeline register and other pipeline registers to the second pipeline register.

86. The method of claim 78, prior to the serializing step, further comprising converting the input data.

87. The method of claim 86, wherein the converting step comprises data zeroing.

88. The method of claim 86, wherein the converting step comprises parity generation and checking.

89. The method of claim 86, wherein the converting step comprises byte shuffling.

90. The method of claim 86, wherein the converting step comprises latency padding.

91. The method of claim 78, after the deserializing step, further comprising converting the output data.

92. The method of claim 91, wherein the converting step comprises parity generating and checking.

93. The method of claim 92, wherein the converting step comprises byte shuffling.

94. The method of claim 93, wherein the converting step comprises latency padding.

* * * * *